(12) United States Patent
Snyder

(10) Patent No.: US 8,606,784 B2
(45) Date of Patent: Dec. 10, 2013

(54) SYSTEM FOR RATING AND RECRUITING SPORTS PLAYERS

(75) Inventor: Nick J. Snyder, Chelan, WA (US)

(73) Assignee: Altus Interactive, Inc., Chelan, WA (US)

( * ) Notice: Subject to any disclaimer, the term of this patent is extended or adjusted under 35 U.S.C. 154(b) by 0 days.

(21) Appl. No.: 13/442,515

(22) Filed: Apr. 9, 2012

(65) Prior Publication Data

US 2013/0268512 A1    Oct. 10, 2013

(51) Int. Cl.
*G06F 17/30* (2006.01)
*G06F 15/16* (2006.01)

(52) U.S. Cl.
USPC ............................. 707/736; 705/7.38; 463/42

(58) Field of Classification Search
USPC .......................................... 707/736; 705/7.38
See application file for complete search history.

(56) References Cited

U.S. PATENT DOCUMENTS

| 7,640,241 | B2 | 12/2009 | Wako | |
|---|---|---|---|---|
| 2001/0034734 | A1* | 10/2001 | Whitley et al. | ............ 707/104.1 |
| 2011/0066664 | A1* | 3/2011 | Goldman et al. | ............. 707/812 |

OTHER PUBLICATIONS

MaxPreps.com (Dec. 27, 2010) [retrieved on Jan. 16, 2013]. Retrieved from the Internet: http://web.archive.org/web/20090810055737/http://www.maxpreps.com/high-schools/-16Wre41b0awlDmpCxVIdw/marist-royal-knights/home.htm.*

* cited by examiner

*Primary Examiner* — Jacob F Bétit
*Assistant Examiner* — Kristopher Andersen
(74) *Attorney, Agent, or Firm* — Buskop Law Group, PC; Wendy Buskop

(57) ABSTRACT

A system for recruiting and rating sports players can include a processor in communication with a data storage, network, and plurality of client devices. A library of league information can be stored in the data storage. The system can form a user interface on the client devices. The system can transmit messages to coaches at schools to request ratings, ability levels, and comments for sports players, which can be averaged. The system can present a recruiter profile in the user interface to college recruiters via the client devices. The recruiter profile can include a search portion to allow for searching of sports players by criteria, a league coaches rating portion for listing coaches associated with a selected sports player, and coach contact information and sports player contact information to allow the college recruiters to contact the coaches, sports players, or combinations thereof to request information or initiate recruitment.

31 Claims, 23 Drawing Sheets

FIGURE 3A

ATHLETES AND COACHES SPORTS NETWORK/WEBSITE — 34

HTTP://WWW.WHODATPREP.COM/351954.HTML

PASSCODE# ###### — 134    SUBMIT — 97    77a

SPORT: FOOTBALL

| | | | | | NCAA DIVISION 1 | ***** | TREMENDOUS ATHLETE | 5 |
| | | | | | NCAA DIVISION 1AA | **** | EXCELLENT ATHLETE | 4 |
| | | | | | NCAA DIVISION II | *** | GREAT ATHLETE | 3 |
| | | | | | NCAA DIV III OR NAIA | ** | GOOD ATHLETE | 2 |
| | | | | | JUNIOR COLLEGE | * | AVERAGE ATHLETE | 1 |

77b — 36

SECOND TEAM ALL LEAGUE | THIRD TEAM ALL LEAGUE | COACH'S BIO/SCHOOL'S INFO

FIRST TEAM ALL LEAGUE | RATED PLAYER'S BIOS/STATS | ADD NEW ATHLETES TO LIST

COACHES, THE LIST BELOW IS YOUR LEAGUES CHOSEN RESULTS FOR THE FIRST TEAM ALL LEAGUE. PLEASE REVIEW EACH OF THE PLAYERS BELOW AND RATE THESE PLAYERS ACCORDING TO THE LEGEND IN THE UPPER RIGHT CORNER AND THE LEVELS 48  12a  28a  13a  56a  58a  60a

| TEAM | NAME | SCHOOL | POSITION | STAR RATING | ABILITY LEVEL | COMMENTS |
|---|---|---|---|---|---|---|
| FIRST | DOUG RAMSEY | CHELAN | OL | | | |
| FIRST | COURTNEY CLANCY | CHELAN | OL | * | 2 | |
| FIRST | MICHAEL AMSEL | CHELAN | DB | ***** | 5 | MVP OFFENSE |
| FIRST | MICHAEL AMSEL | CHELAN | QB | ***** | 5 | MVP OFFENSE |
| FIRST | JOHN BETZ | CASCADE | RB | ** | 3 | |
| FIRST | ERIC OSCARSON | CHELAN | WR | ** | 2 | |
| FIRST | JOSE APARICO | CHELAN | OL | **** | 2 | |
| FIRST | JIMMY JONES | TONASKET | OL | *** | 4 | |
| FIRST | COLE SWARTZ | CHELAN | RB | | 3 | |
| FIRST | BILLIE POPPY | CHELAN | RB | | 1 | |

SUBMIT/SAVE ALL RATINGS — 108

ATHLETES AND COACHES SPORTS NETWORK/WEBSITE

HTTP://WWW.WHODATPREP.COM/351954.HTML

PASSCODE# ######

SUBMIT

SPORT: FOOTBALL

| | |
|---|---|
| NCAA DIVISION 1 | ***** TREMENDOUS ATHLETE 5 |
| NCAA DIVISION 1AA | **** EXCELLENT ATHLETE 4 |
| NCAA DIVISION II | *** GREAT ATHLETE 3 |
| NCAA DIV III OR NAIA | ** GOOD ATHLETE 2 |
| JUNIOR COLLEGE | * AVERAGE ATHLETE 1 |

| FIRST TEAM ALL LEAGUE | THIRD TEAM ALL LEAGUE | COACH'S BIO/SCHOOL'S INFO |
|---|---|---|
| SECOND TEAM ALL LEAGUE | RATED PLAYER'S BIOS/STATS | ADD NEW ATHLETES TO LIST |

COACHES, THE LIST BELOW IS YOUR LEAGUES CHOSEN RESULTS FOR THE SECOND TEAM ALL LEAGUE. PLEASE REVIEW EACH OF THE PLAYERS BELOW AND RATE THESE PLAYERS ACCORDING TO THE LEGEND IN THE UPPER RIGHT CORNER AND THE LEVELS

| TEAM | NAME | SCHOOL | POSITION | STAR RATING | ABILITY LEVEL | COMMENTS |
|---|---|---|---|---|---|---|
| SECOND | DOUG RAMSEY | CHELAN | OL | | | |
| SECOND | COURTNEY CLANCY | CHELAN | OL | * | 2 | |
| SECOND | MICHAEL AMSEL | CHELAN | DB | ***** | 5 | MVP OFFENSE |
| SECOND | MICHAEL AMSEL | CHELAN | QB | ***** | 5 | MVP OFFENSE |
| SECOND | JOHN BETZ | CASCADE | RB | ** | 3 | |
| SECOND | ERIC OSCARSON | CHELAN | WR | ** | 2 | |
| SECOND | JOSE APARICO | CHELAN | OL | **** | 4 | |
| SECOND | JIMMY JONES | TONASKET | OL | *** | 3 | |
| SECOND | COLE SWARTZ | CHELAN | RB | | | |
| SECOND | BILLIE POPPY | CHELAN | RB | | 1 | |

SUBMIT/SAVE ALL RATINGS

FIGURE 3C

ATHLETES AND COACHES SPORTS NETWORK/WEBSITE — 34

HTTP://WWW.WHOOATFREE.COM/351954.HTML

PASSCODE# `######` — 134

| | | | | |
|---|---|---|---|---|
| NCAA DIVISION 1 | ***** | | TREMENDOUS ATHLETE | 5 |
| NCAA DIVISION 1AA | **** | | EXCELLENT ATHLETE | 4 |
| NCAA DIVISION II | *** | | GREAT ATHLETE | 3 |
| NCAA DIV III OR NAIA | ** | | GOOD ATHLETE | 2 |
| JUNIOR COLLEGE | * | | AVERAGE ATHLETE | 1 |

SPORT: FOOTBALL    SUBMIT — 97   77a

SECOND TEAM ALL LEAGUE | FIRST TEAM ALL LEAGUE

THIRD TEAM ALL LEAGUE | RATED PLAYER'S BIOS/STATS | COACH'S BIO/SCHOOL'S INFO | ADD NEW ATHLETES TO LIST

COACHES, THE LIST BELOW IS YOUR LEAGUES CHOSEN RESULTS FOR THE THIRD TEAM ALL LEAGUE. PLEASE REVIEW EACH OF THE PLAYERS BELOW AND RATE THESE PLAYERS ACCORDING TO THE LEGEND IN THE UPPER RIGHT CORNER AND THE LEVELS

| TEAM | NAME | SCHOOL | POSITION | STAR RATING | ABILITY LEVEL | COMMENTS |
|---|---|---|---|---|---|---|
| THIRD | DOUG RAMSEY | CHELAN | OL | | | |
| THIRD | COURTNEY CLANCY | CHELAN | OL | * | 2 | |
| THIRD | MICHAEL AMSEL | CHELAN | DB | ***** | 5 | MVP OFFENSE |
| THIRD | MICHAEL AMSEL | CHELAN | QB | ***** | 5 | MVP OFFENSE |
| THIRD | JOHN BETZ | CASCADE | RB | ** | 3 | |
| THIRD | ERIC OSCARSON | CHELAN | WR | ** | 2 | |
| THIRD | JOSE APARICO | CHELAN | OL | ** | 2 | |
| THIRD | JIMMY JONES | TONASKET | OL | **** | 4 | |
| THIRD | COLE SWARTZ | CHELAN | RB | *** | 3 | |
| THIRD | BILLIE POPPY | CHELAN | RB | | 1 | |

SUBMIT/SAVE ALL RATINGS — 108

*FIGURE 4*

🗔 ATHLETES AND COACHES SPORTS NETWORK/WEBSITE  — □ ✕

| ↑ ↓ | HTTP://WWW.WHODATPREE.COM/351954.HTML ▽ | PASSCODE# ###### | SUBMIT | NCAA DIVISION 1 ***** | TREMENDOUS ATHLETE 5 |
|---|---|---|---|---|---|
| | | 134 | 97 | NCAA DIVISION 1AA **** | EXCELLENT ATHLETE 4 |
| SPORT: FOOTBALL | | | | NCAA DIVISION II *** | GREAT ATHLETE 3 |
| | | | | NCAA DIV III OR NAIA ** | GOOD ATHLETE 2 |
| | | | | JUNIOR COLLEGE * | AVERAGE ATHLETE 1 |

| SECOND TEAM ALL LEAGUE | THIRD TEAM ALL LEAGUE | ADD NEW ATHLETES TO LIST |
|---|---|---|
| FIRST TEAM ALL LEAGUE | RATED PLAYER'S BIOS/STATS | COACH'S BIO/SCHOOL'S INFO |

COACHES, PLEASE COMPLETE YOUR ALL-LEAGUE ATHLETES BIOS/STATS FOR THE OPPORTUNITY FOR THE THESE ATHLETES TO PLAY AT COLLEGE LEVEL BALL. THESE ATHLETES WILL HAVE THEIR OWN WEBPAGE THAT COLLEGE COACHES/RECRUITERS CAN VIEW THEIR BIO/STATS AND GAME FILMS

| PASSCODE# | YEAR | NAME | EMAIL | CLASS | HEIGHT | WEIGHT | POSITION | 40 YARD | BENCH | VERTICAL | S. SHUTTLE | L. SHUTTLE | STATS |
|---|---|---|---|---|---|---|---|---|---|---|---|---|---|
| 3596595 | 2012 | MIKE AIMS | MIKE@... | 2013 | 5'10" | 170 | QB | 4.5 | 180 | 30 | 5.4 | 7.85 | |
| 9658762 | 2012 | SAM DUNN | SAM@... | 2013 | 5'7" | 235 | OL | 5.7 | 0 | 0 | 0 | 8 | |
| 5689713 | 2012 | BILL DUNN | BILL@... | 2013 | 5'8" | 180 | RB | 4.4 | 285 | 32 | 0 | 0 | |
| 2976423 | 2012 | ERIC HASS | ERIC@... | 2013 | 6'4" | 205 | WR | 5.7 | 0 | 0 | 0 | 0 | |
| 5871654 | 2012 | RYAN DYE | RYAN@... | 2013 | 6'1" | 195 | WR | 4.8 | 200 | 0 | 0 | 0 | |
| 9517534 | 2012 | AARON LE | A.LE@... | 2013 | 5'10" | 170 | DB | 4.6 | 180 | 30 | 5.4 | 7.85 | |
| 6482791 | 2012 | BRET SHEY | BRET@... | 2013 | 5'7" | 235 | DL | 0 | 0 | 0 | 0 | 0 | |
| 2819634 | 2012 | TOM ORE | TOM@... | 2013 | 6'3" | 205 | WR | 4.6 | 0 | 0 | 0 | 0 | |
| 8607089 | 2012 | DRE SHAW | DRE@... | 2013 | 6'1" | 245 | OL | 0 | 300 | 20 | 0 | 0 | |
| 2087607 | 2012 | CHET MAY | CHET@... | 2013 | 5'9" | 195 | LB | 5.1 | 250 | 28 | 5.6 | 7.9 | |

SAVE STATS/BIO DATA

FIGURE 6

ATHLETES AND COACHES SPORTS NETWORK/WEBSITE

HTTP://WWW.WHODATPREP.COM/251354.HTML

PASSCODE# ######  SUBMIT

SPORT: FOOTBALL

| NCAA DIVISION 1 | ***** | TREMENDOUS ATHLETE | 5 |
| NCAA DIVISION 1AA | **** | EXCELLENT ATHLETE | 4 |
| NCAA DIVISION II | *** | GREAT ATHLETE | 3 |
| NCAA DIV III OR NAIA | ** | GOOD ATHLETE | 2 |
| JUNIOR COLLEGE | * | AVERAGE ATHLETE | 1 |

SECOND TEAM ALL LEAGUE
FIRST TEAM ALL LEAGUE
THIRD TEAM ALL LEAGUE
RATED PLAYER'S BIOS/STATS

COACHES, PLEASE FILL OUT THE FIELDS TO THE RIGHT (SO THE COUNSELOR CAN FILL IN THE GPA, SAT, ACT FOR THE ATHLETES) AND COLLEGE COACHES MAY NEED TO EMAIL YOU ABOUT ATHLETES (SO PLEASE FILL OUT ALL THE FIELDS TO THE RIGHT AND THE NUMBERS IN THE TABLE BELOW). YOUR "POWER RANKING" IS CALCULATED FROM THE NUMBERS YOU ENTER BELOW:

ADD NEW ATHLETES TO THE LIST
COACH'S BIO/SCHOOL'S INFO

CURRENT SCHOOL: CHELAN          STATE: WA
LEAGUE: CARIBOU TRAIL            DIVISION: 1A
YOUR NAME: DARREN TALLY
YOUR EMAIL ADDRESS: DARREN@TALLYFINANCIAL.ORG
SPORT: FOOTBALL
HS PHONE #:
COUNSELOR AT THE HIGH SCHOOL: TONYA LUINSTRA
COUNSELOR EMAIL ADDRESS: LUINSTRA@CHELANSCHOOLS.ORG
ATHLETIC DIRECTOR AT THE HIGH SCHOOL: SCOTT RABB
ATHLETIC DIRECTOR EMAIL ADDRESS: SRABB@CHELANSCHOOLS.ORG

| QUESTION? | # OR COLLEGE (ANSWER) |
|---|---|
| HOW MANY YEARS HAVE YOU COACHED? | 7 |
| HOW MANY YEARS HAS YOUR TEAM BEEN LEAGUE CHAMPS? | 2 |
| HOW MANY YEARS HAS YOUR TEAM BEEN STATE CHAMPS? | 0 |
| NUMBER OF WINS ON RECORD? | 45 |
| NUMBER OF POST SEASON OR PLAY-OFF WINS? | 6 |
| NUMBER OF SEASONS AS HEAD COACH? | 7 |

LIST ALL ATHLETES YOU COACHED THAT HAVE WENT ON TO PLAY COLLEGE SPORTS:

| ATHLETE'S NAME | CLASS | COLLEGE/UNIV. PLAYING/PLAYED AT |
|---|---|---|
| ROBIN WEATHERSBY | 2011 | SIMON FRASER, BC |

SUBMIT/SAVE DATA

FIGURE 7

```
FORM4
[SEND] [FORWARD]
TO...     LUINSTRAT@CHELANSCHOOLS.ORG
FROM...   NICKSNYDER@ALTUS.COM
SUBJECT... COUNSELOR, PLEASE ENTER THE GPA, SAT & ACT SCORES FOR THE LIST OF ATHLETES FROM YOUR SCHOOL...

COUNSELOR,
PLEASE SELECT THE LINK BELOW TO PROCEED DIRECTLY INTO THE LEAGUESTARZ WEBSITE, SO YOU CAN ENTER THE ATHLETES IN YOUR SCHOOL GPA, SAT & ACT SCORES/NUMBERS.

YOU MAY ALSO WANT TO KEEP THIS EMAIL MESSAGE TO LOG ON TO THE WEBSITE AND ENTER GPA, SAT & ACT SCORES FOR FUTURE ATHLETES FROM YOUR SCHOOL.

YOUR PASSCODE # IS LISTED TO THE LEFT (5 DIGIT NUMBER) AND YOUR PASSWORD IS YOUR FIRST NAME

509837    HTTP:\\WWW.LEAGUESTARZ.COM/VOLLEYBALL/509837.HTML

SINCERELY,
NICK SNYDER
CEO, ALTUS
```

FIGURE 8

ATHLETES AND COACHES SPORTS NETWORK/WEBSITE — 34

HTTP://WWW.WHODATPREP.COM/351954.HTML

PASSCODE# ###### — 148   SUBMIT

PASSWORD ****** — 149   SUBMIT

WELCOME COUNSELOR/ADMINISTRATOR:

PLEASE SELECT THE CELLS AND ENTER EACH ATHLETE'S ACADEMIC DATA IN THE TABLE BELOW. PRESS THE SAVE BUTTON WHEN YOU HAVE FINISHED ENTERING EACH PLAYERS DATA IN THE TABLE.

| PLAYER — 12 | YEAR — 81 | CLASS — 19 | RANK — 21 | GPA — 25 | SAT — 27 | ACT — 29 | TRANSCRIPTS — 160 |
|---|---|---|---|---|---|---|---|
| DOUG RAMSEY | 2012 | 2012 | 26 | 3.2 | 1300 | 55 | 0 |
| COURTNEY CLANCY | 2012 | 2012 | 40 | 2.7 | 0 | 0 | 0 |
| MICHAEL AMSEL | 2012 | 2013 | 10 | 3.8 | 1240 | 55 | 0 |
| AARON AMSEL | 2012 | 2012 | 30 | 2.85 | 1150 | 0 | 0 |
| JOHN BETZ | 2012 | 2013 | 37 | 2.8 | 1110 | 50 | 0 |
| ERIC OSCARSON | 2012 | 2014 | 0 | 0 | 0 | 0 | 0 |
| JOSE APARICO | 2012 | 2013 | 0 | 0 | 1125 | 0 | 0 |
| JIMMY JONES | 2012 | 2012 | 16 | 3.76 | 1250 | 55 | 0 |
| COLE SWARTZ | 2012 | 2012 | 0 | 0 | 0 | 0 | 0 |
| BILLIE POPPY | | | | | | | |

SUBMIT/SAVE ALL DATA — 109

FIGURE 9

ATHLETES AND COACHES SPORTS NETWORK/WEBSITE

HTTP://WWW.WHO

GETTING STARTED...

PASSCODE#: ###### SUBMIT
PASSWORD: ******** SUBMIT

| | |
|---|---|
| NCAA DIVISION 1 | ***** TREMENDOUS ATHLETE 5 |
| NCAA DIVISION 1AA | **** EXCELLENT ATHLETE 4 |
| NCAA DIVISION II | *** GREAT ATHLETE 3 |
| NCAA DIV III OR NAIA | ** GOOD ATHLETE 2 |
| JUNIOR COLLEGE | * AVERAGE ATHLETE 1 |

SEARCHING FOR ATHLETES

SPORT: FOOTBALL ▼  POSITION: ALL ▼  MIN AVG RATING: ** ▼  STATE: WA ▼  DIVISION: ALL ▼  LEAGUE: CARIBOU TRAIL ▼  SUBMIT

MIKE LEACH   WSU   BILL JONES

● DEFAULT   ○ SELECT FIELDS (SORT BY)

| PLAYER | SCHOOL | POSITION | HEIGHT | WEIGHT | CLASS | RANK | AVG | GPA | SAT | ACT | UNI # | VIDEO LINK | BENCH | VERT | SHORT | LONG | SPORT | STATE | LEAGUE | DIVISION | STATS |
|---|---|---|---|---|---|---|---|---|---|---|---|---|---|---|---|---|---|---|---|---|---|
| MIKE AIMS | YEATS | QB, DB | 5'10" | 170 | 2013 | 10 | 5.5 | 3.8 | 0 | 55 | 10 | HIGHLIGHT | 180 | 30 | 4.5 | 7.8 | FB | WA | CAR | 1AA | 20 TD/6 INT |
| SAM DUNN | YEATS | QB, DB | 5'7" | 190 | 2013 | 13 | 4.4 | 3.6 | 0 | 55 | 12 | BIG PLAY | 0 | 28 | 5.7 | 6.2 | FB | WA | CAR | 1AA | 12 TD/1INT |
| BILL DUNN | YEATS | RB | 5'8" | 235 | 2013 | 12 | 4.3 | 4.0 | 0 | 60 | 8 | 95YRDR | 285 | 32 | 4.4 | 7.6 | FB | WA | CAR | 1AA | 2546 RUSHING |

☐ ADD SELECTED ATHLETES (TABLE ABOVE) TO YOUR FAVORITES LIST/QUEUE (TABLE BELOW)

FAVORITES LIST/QUEUE

| POWER RANK | COACH | SCHOOL | STAR RATING | ABILITY RATING | WINS | PLAYOFF WINS | YEARS COACHING | YEARS HERE | POWER RANKING | # LEAGUE CHAMPS | # STATE CHAMPS | YRS PLAYED COLLEGE | COLLEGE PLAYED AT |
|---|---|---|---|---|---|---|---|---|---|---|---|---|---|
| 1 | DARREN TALLY | CHELAN | 5 | 0.5 | 45 | 6 | 7 | 7 | 67.5 | 2 | 0 | 5 | WSU |
| 1 | BILL THOMAS | | 4 | 0.4 | | | | | | | | | |

LEAGUE'S COACHES RATINGS FOR: MIKE AIMS

| DATE RATED | COMMENTS | POSITION |
|---|---|---|
| 02/24/2012 | MVP | QB, DB |
| 02/25/2012 | MVP | QB, DB |

CONTACT COACHES
CONTACT ATHLETE

| COACH | EMAIL |
|---|---|
| DARREN TALLY | DARREN@TALLEYFINANCIAL.ORG |
| | BILL@CHELANSCHOOL.EDU |
| | EDALEY@CASCADE.WEDNET.EDU |
| | MIKEY@EMAIL.COM |

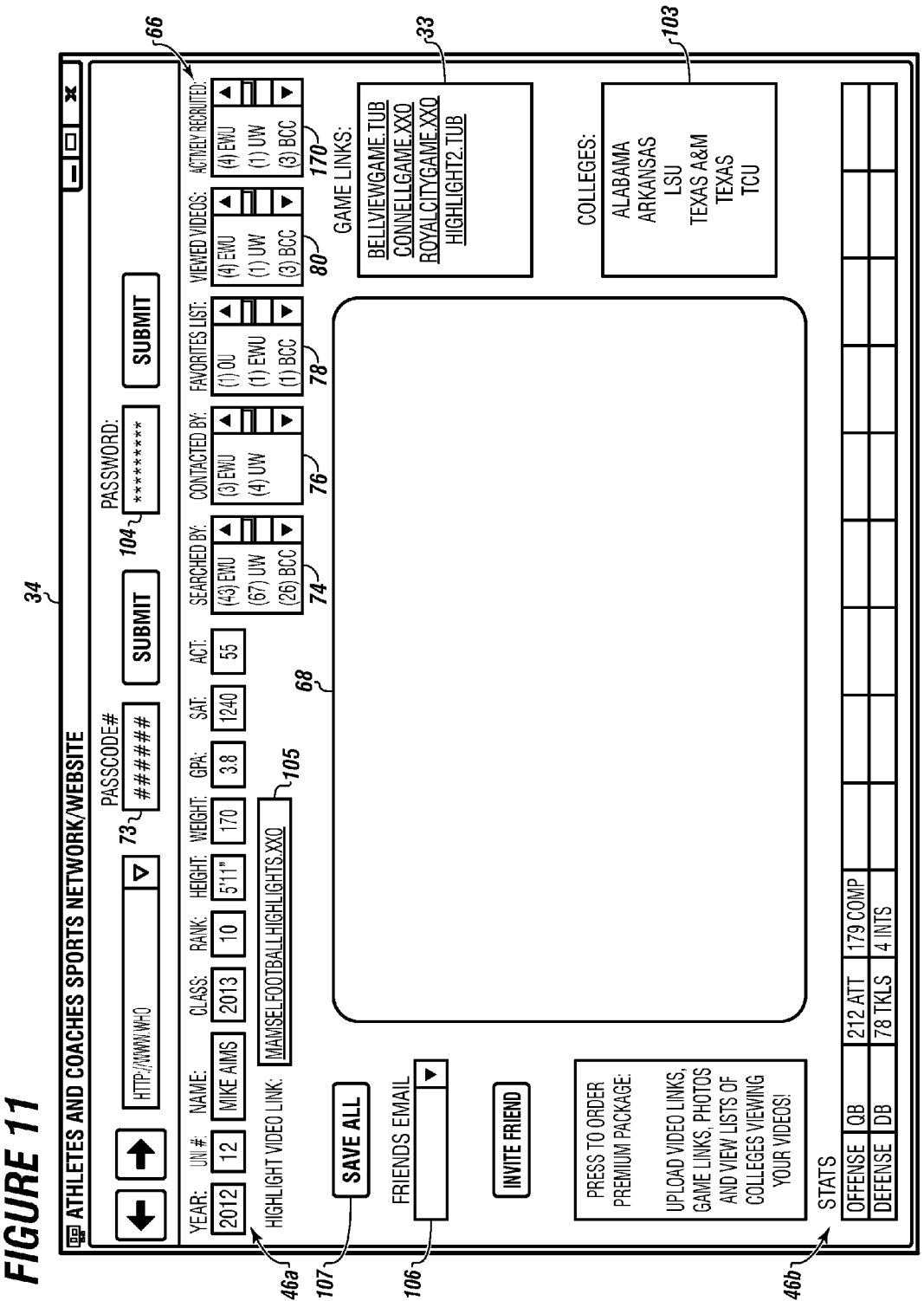

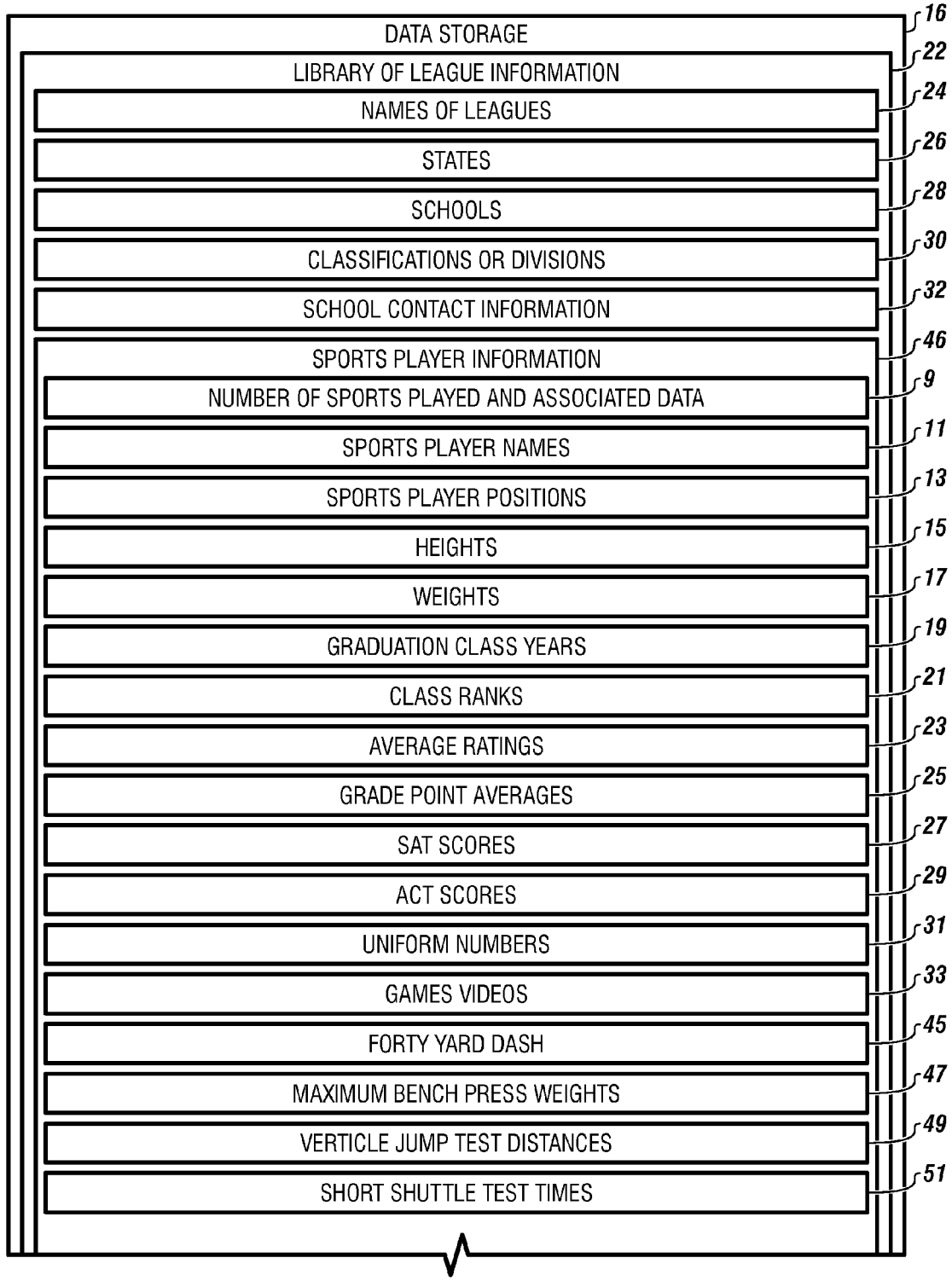

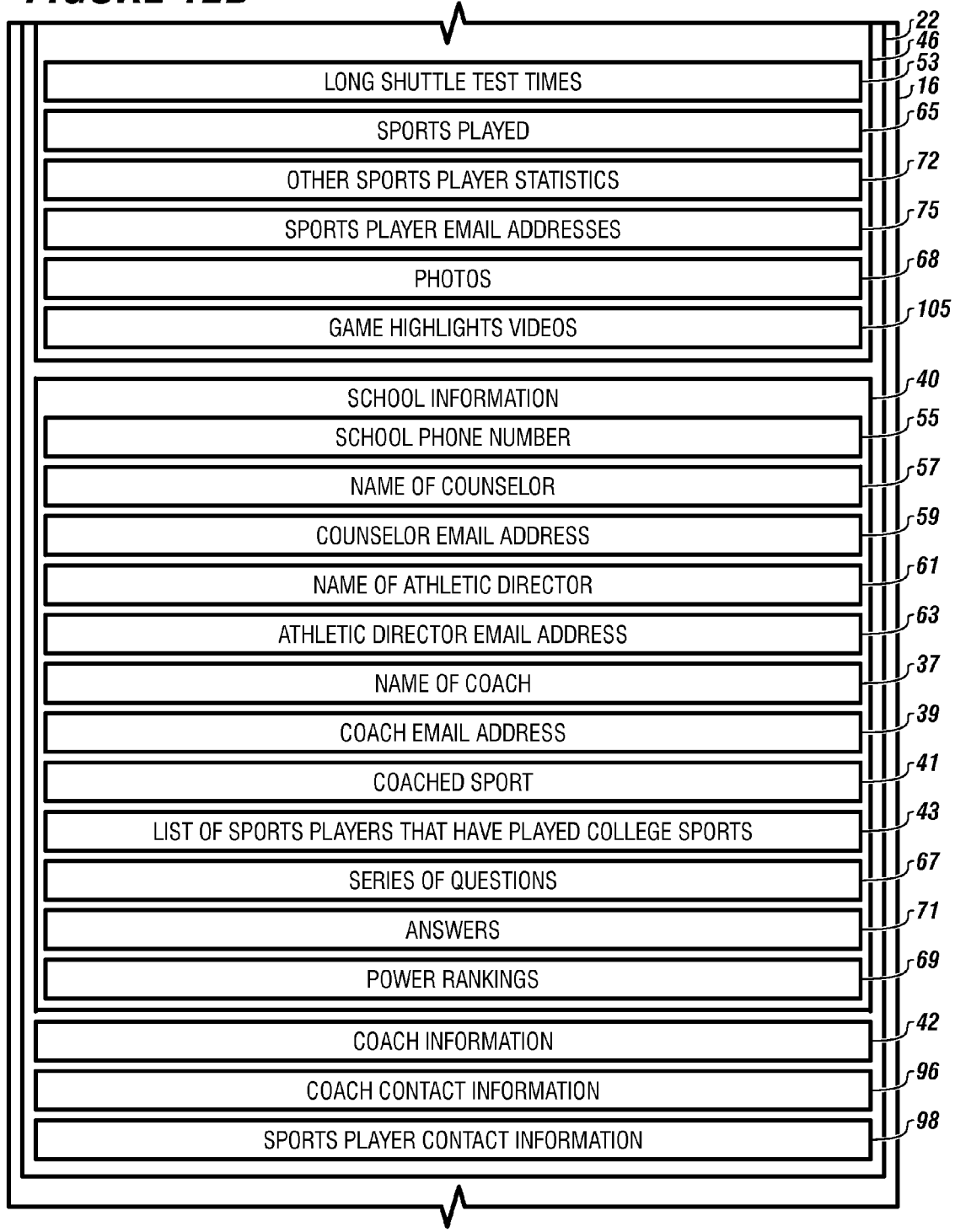

SYSTEM FOR RATING AND RECRUITING SPORTS PLAYERS

FIELD

The present embodiments generally relate to a system for recruiting and rating sports players.

BACKGROUND

A need exists for a system for recruiting and rating sports players for high school or junior college that allows the coaches of the sports players to provide ratings and counselors of the sports players to provide additional sports player information for input into a library of league information; thereby allowing the sports players to be considered by college recruiters.

A need exists for a system for recruiting and rating sports players that allows the college recruiters to search the library of league information for sports players matching criteria, and provides the college recruiters with contact information for the sports players and coaches; thereby allowing the college recruiters to request additional information about the sports players.

A need exists for a system for recruiting and rating sports players that provides a dual rating for the sports players including a rating identifying an appropriate college division for the sports player and an ability level identifying the sports players ability within the identified college division.

A need exists for a system for recruiting and rating sports players that is configured to receive ratings and ability levels for a sports player from each coach within a league that the sports player is in, and to average the ratings and ability levels.

A need exists for a system for recruiting and rating sports players that provides information to the college recruiters about the coaches that have rated the sports players, including a power ranking for the coach; thereby allowing the college recruiters to assess the coaches ratings of the sports players based on the coaches power rankings.

A need exists for a system for recruiting and rating sports players that allows the sports players to track recruitment activities associated with that sports player.

A need exists for a system for recruiting and rating sports players for Division I colleges and colleges below Division I.

The present embodiments meet these needs.

BRIEF DESCRIPTION OF THE DRAWINGS

The detailed description will be better understood in conjunction with the accompanying drawings as follows:

FIGS. 3A-3C depict embodiments of a coach profile for allowing the coaches to rate sports players.

FIG. 4 depicts an embodiment of the coach profile having a rated player's biography and statistics portion, allowing the coaches to provide additional sports player information about each sports player listed therein.

FIG. 6 depicts an embodiment of a coach biography and school information portion of the coach profile, allowing school information to be input into the library of league information.

FIG. 7 depicts an embodiment of an email to a counselor that can be provided by the system.

FIG. 8 depicts an embodiment of a counselor profile that can be accessed by counselors at schools to add additional sports player information into the library of league information.

FIG. 9 depicts an embodiment of a recruiters profile that can be accessed by college recruiters for searching for sports players in the library of league information that match criteria selected by the college recruiters.

FIG. 10A depicts an embodiment of the recruiters profile showing a favorites list.

FIG. 10B depicts an embodiment of the recruiters profile showing an active recruitment list.

FIG. 11 depicts an embodiment of a sports player profile that can be accessed by the sports players to track recruitment activities associated with that sports player and to upload pictures and game videos.

FIGS. 12A-12C depict an embodiment of a library of league information, a library of prewritten message, and a library of tutorial stored in a data storage of the system.

Figure 1:
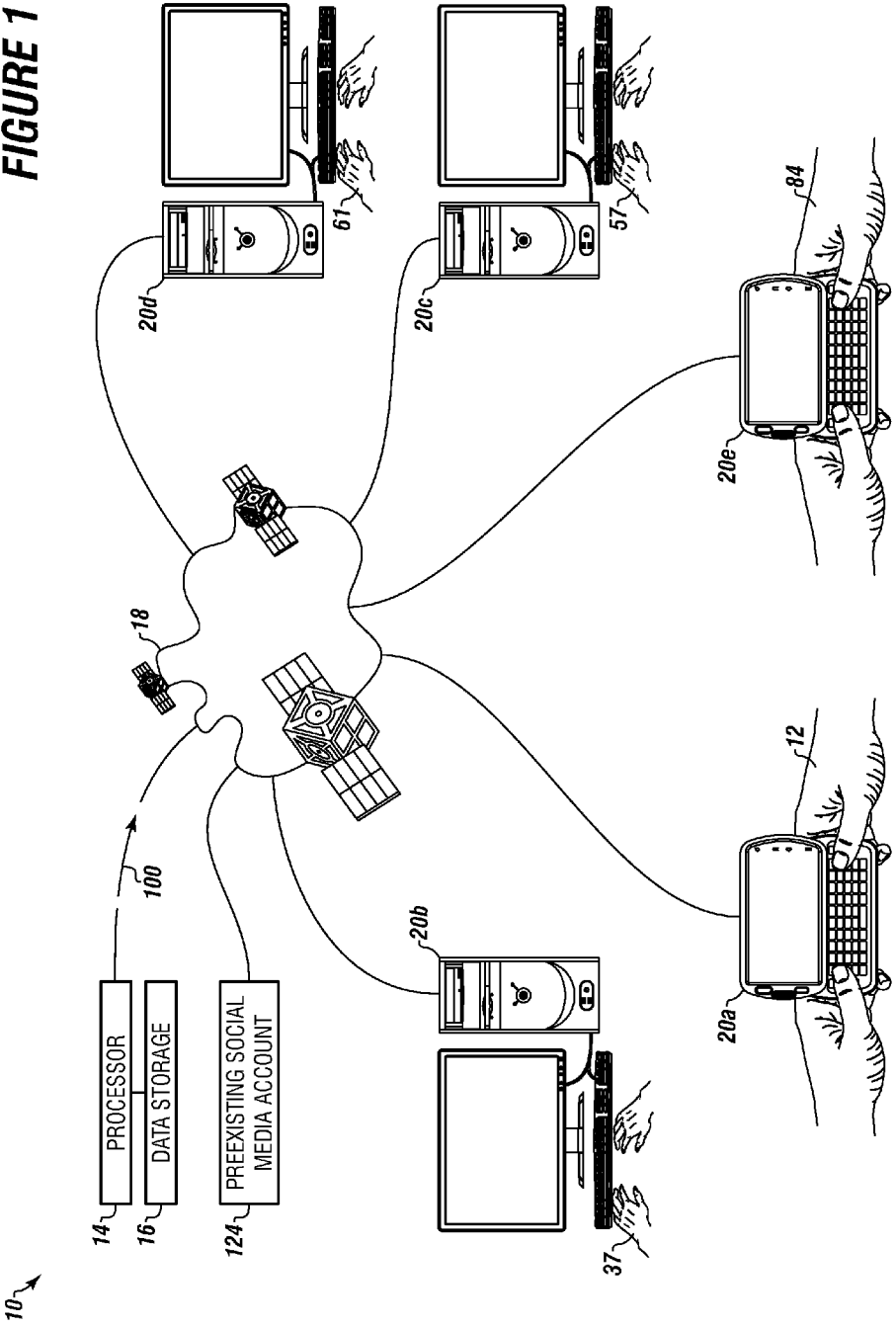
FIG. 1 depicts an embodiment of the system for rating and recruiting sports players.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments relate to a system for recruiting and rating sports players. The sports players can be high school sports players, junior college sports players, club sports players, tournament sports players, or the like. Club sports players and tournament sports players can include sports players playing sports in the Amateur Athletic Union (AAU) or the like.

The sports played by the sports players can be any sport, including but not limited to football, baseball, soccer, tennis, volleyball, racquetball, golf, basketball, track and field sports, swimming or swimming related sports, hockey, wrestling, lacrosse, rugby or the like.

The system can include a processor in communication with a data storage and a network. The network can be the internet, a satellite network, a cellular network, a traditional telephone service network, another wired network, another wireless network, or combinations thereof.

The processor can be in communication through the network with a plurality of client devices. The client devices can be cellular phones, personal digital assistants, desktop computers, laptop computers, tablet computers, or another device configured to communicate via the network. As such, the processor can communicate with various users through the network. The users can include coaches, counselors, athletic directors at schools, other personnel at the schools, the sports players, and college recruiters.

A library of league information can be stored in the data storage. The library of league information can include information related to various leagues. The leagues can include districts, conferences, clubs, or the like that the sports players at the schools play within.

The information in the library of league information can be sorted by names of leagues, states in which each league resides, schools attended by the sports players in each league, classification or division for each school, school contact information, and the like.

The system can be used to form a user interface and present the user interface on each client device; thereby allowing the users of the client devices to view one or more portions of the information in the library of league information, input information into the library of league information, or combinations thereof.

The system can transmit messages, such as emails, to coaches or other personnel at the schools using the school contact information. The messages can be emails, text messages, or combinations thereof.

The messages can include requests for the coaches to provide ratings, ability levels, and comments for each sports player in the leagues associated with the coaches.

The messages can also include email links that allow the coaches to view coach profiles within the user interface. The coach profiles can be configured to receive the ratings, the ability levels, and the comments from the coaches, such as via input fields that can be filled in using the client devices.

The coaches can use the ratings to indicate a division or type of college that is appropriate for the sports players. The coaches can use the abilities levels to indicate a level of sports ability for the sports player within the indicated division or type of college. As such, the system can receive ratings and abilities levels from coaches that coach within the leagues of the sports players that they are rating.

The system can average the ratings and ability levels for each sports player, which can reduce biases in individual ratings and ability levels, such as biases of a particular sports player's coach.

The system can present a recruiters profile in the user interface to college recruiters via the client devices.

The recruiters profile can include a search portion configured to allow the college recruiters to search for sports players by criteria. The system can search the library of league information to form search results based upon the criteria. The search results can be presented in the recruiter's profile, and can include sports player information for each sports player.

The recruiter's profile can include a league coaches rating portion that can present a list of coaches associated with a selected sports player from the search results. The league coaches rating portion can also include the ratings, the ability levels, and the comments for the selected sports player.

The recruiter's profile can include coach contact information and sports player contact information, such as email addresses, phone numbers, and physical addresses. As such, the college recruiters can contact the coaches, sports players, or both to seek additional information or initiate recruitment.

Turning now to the Figures, FIG. 1 depicts an embodiment of the system for recruiting and rating sports players.

The system 10 can include a processor 14 in communication with a data storage 16 and a network 18.

The processor 14 can be in communication through the network 18 with a plurality of client devices 20a, 20b, 20c, 20d, and 20e.

For example, the client device 20a can be operated by a sports player 12, the client device 20b can be operated by a coach 37, the client device 20c can be operated by a counselor 57, the client device 20d can be operated by an athletic director 61, and the client device 20e can be operated by a college recruiter 84.

The sports player 12 can be a high school sports player or junior college sports player, the coach 37 can be a high school coach or junior college coach, the counselor 57 can be a counselor at a high school or junior college, the athletic director 61 can be a an athletic director at a high school or junior college, and the college recruiter 84 can be a college recruiter for any division of college.

The processor 14 can transmit messages 100 to the client devices 20a-20e for providing invitations to login to the user interface for inputting information into the library of league information, viewing information in the library of league information, or the like.

The processor 14 can also be in communication with a preexisting social media account 124, which can allow the sports player 12 to insert a social media identifier into the data storage 16 for linking the sports player's 12 sports player profile with friends identified in the preexisting social media account 124.

Figure 2:
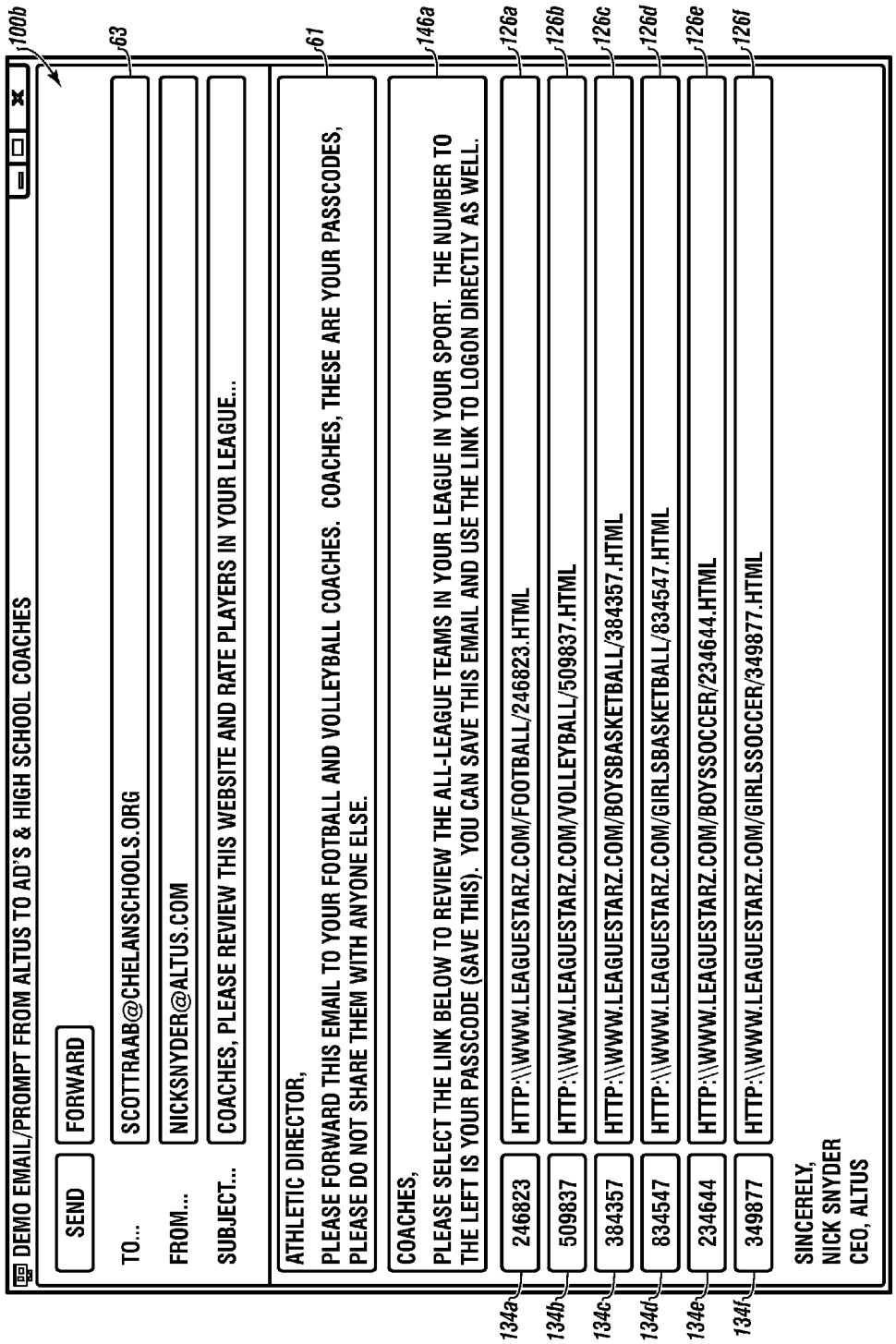
FIG. 2 depicts an embodiment of an email to a coach that can be provided by the system.

FIG. 2 depicts an embodiment of a message requesting ratings of sports players from coaches that can be provided by the system.

The message 100b, which can be an email, can be transmitted directly to the coaches if the coaches email addresses are in the library of league information, or to other personnel at the schools requesting that the other personnel forward the email to the coaches. For example, the message 100b can be transmitted to an athletic director 61 using an athletic director email address 63 from the school contact information in the library of league information.

The message 100b can include a request 146a for the coaches to provide ratings, ability levels, and comments for each sports player in the leagues associated with the coaches.

The message 100b can also include email links 126a, 126b, 126c, 126d, 126e, and 126f for each coach at the school. In operation, the coaches can select their associated email link 126a-126f to view the coach profiles within the user interface.

The message 100b can also include automatically generated coach passcodes 134a, 134b, 134c, 134d, 134e, and 134f for each coach, which can allow the coaches to login to the user interface.

FIGS. 3A-3C depict embodiments of a coach profile having a first team portion, a second team portion, and a third team portion, allowing the coaches to rate sports players associated with each team.

In operation, after selection of one of the email links depicted in FIG. 2, a coach profile 36 can be presented in the user interface 34 on a client device.

The coach can enter a coach passcode 134 into a coach login portion of the coach profile 36 and select a coach submit button 97; thereby allowing the coach to login to the coach profile 36.

The coach profile 36 can include a first team portion 54 configured to display a list of sports players 12a in a first team 48 for an associated league. For example, the first team 48 can include the best player(s) in each position within the associated league.

The coach profile 36 can be configured to receive ratings 56a, ability levels 58a, and comments 60a from the coach for each sports player 12a in the first team 48 via the user interface 34.

The coach profile 36 can include a second team portion 62 configured to display a list of sports players 12b in a second team 50 for the associated league. For example, the second team 50 can include the second best player(s) in each position within the associated league.

The coach profile 36 can be configured to receive ratings 56b, ability levels 58b, and comments 60b from the coach for each sports player 12b in the second team 50 via the user interface 34.

The coach profile 36 can include a third team portion 64 configured to display a list of sports players 12c in a third team 52 for the associated league. For example, the third team 52 can include the third best player(s) in each position within the associated league, such as honorable mention players.

The coach profile 36 can be configured to receive ratings 56c, ability levels 58c, and comments 60c from the coach for each sports player 12c in the third team 52 via the user interface 34.

The comments 60a-60c can be related to the sports player's 12a-12c athletic abilities or achievements. For example, the comments 60a-60c can indicate that a particular sports player is an MVP (most valuable player) or the like.

The coach profile 36 can also display the schools 28a, 28b, and 28c and the sports player positions 13a, 13b, and 13c of each sports player 12a-12c in the first team 48, the second team 50, and the third team 52.

The coach profile 36 can be configured to allow the lists of sports players 12a-12c in the first team 48, the second team 50, and the third team 52 to be sortable by categories, such as by first team 48, second team 50, third team 52, sports player 12a-12c, schools 28a-28c, sports player positions 13a-13c, ratings 56a-56c, ability levels 58a-58c, and comments 60a-60c.

For example, the coach can select the column presenting the ratings 56a to sort the lists of sports players 12a in the first team 48 from lowest to highest rating 56a or from highest to lowest rating 56a. Each of the columns in the first team portion 54, second team portion 62, and third team portion 64 can be selected for sorting the lists of sports players 12a-12c.

The user interface 34 can be configured to present one or more legends to provide explanations for each rating 56a-56c and each ability level 58a-58c. For example, the user interface 34 can present a first legend 77a explaining that a rating of one star indicates that a particular sports player is rated for a junior college, a rating of two stars indicates that a particular sports player is rated for a National Collegiate Athletic Association (NCAA) Division III college or a National Association of Intercollegiate Athletics (NAIA) college, a rating of three stars indicates that a particular sports player is rated for an NCAA Division II college, a rating of four stars indicates that a particular sports player is rated for an NCAA Division IAA college, and a rating of five stars indicates that a particular sports player is rated for an NCAA Division 1 college.

The user interface 34 can have a second legend 77b that can explain that an ability level of one star indicates an average athlete within the rating for that sports player, an ability level of two stars indicates a good athlete within the rating for that sports player, an ability level of three stars indicates a great level athlete within the rating for that sports player, an ability level of four stars indicates an excellent level athlete within the rating for that sports player, and an ability level of five stars indicates a tremendous level athlete within the rating for that sports player.

A submit and save all ratings button 108 can be presented in the first team portion 54, second team portion 62, and third team portion 64, and configured to be selected by the coach via the user interface 34 for submitting and saving the ratings 56a-56c, ability levels 58a-58c, and comments 60a-60c into the library of league information.

FIG. 4 depicts an embodiment of the coach profile having a rated players biography and statistics portion configured to allow the coaches to provide additional sports player information about each sports player listed therein.

The user interface 34 can present the coach profile 36, which can include a rated players biography and statistics portion 102 configured to allow the coaches to enter the additional sports player information 46 into the user interface 34 for storage in the library of league information.

For example, the processor can transmit a message to a particular coach when sports players 12 coached by that coach have been added into the library of league information. The coach can then access the user interface 34 to input the additional sports player information 46 related to that sports player using the rated players biography and statistics portion 102.

The coach can input the sports player contact information 98, such as the sports player email address, allowing the sports players 12 to be contacted through the system.

The coach can input the sports player's 12 graduation class year 19, sports player height 15, sports player weight 17, sports player position 13, forty yard dash 45, maximum bench press weight 47, vertical jump test distance 49, short shuttle test time 51, long shuttle test time 53, and other sports player statistics 72.

The rated player's biography and statistics portion 102 can also display the dates 81 the sports players were added and the sports player passcodes 73.

In operation, the sports player passcodes 73 can be selected to allow the coaches to view the sports player profiles.

The rated player's biography and statistics portion 102 can be sortable by categories of sports player information 46. For example, the coaches can select the column that lists the sports player heights 15 to sort the sports players 12 from shortest to tallest or from tallest to shortest.

The rated players biography and statistics portion 102 can include a save statistics and biography data button 99 configured to be selected by the coaches to save the entered sports player information 46 into the library of league information.

The legends 77a and 77b, coach passcode 134, and coach submit button 97 can be presented along with the rated player's biography and statistics portion 102.

Figure 5:
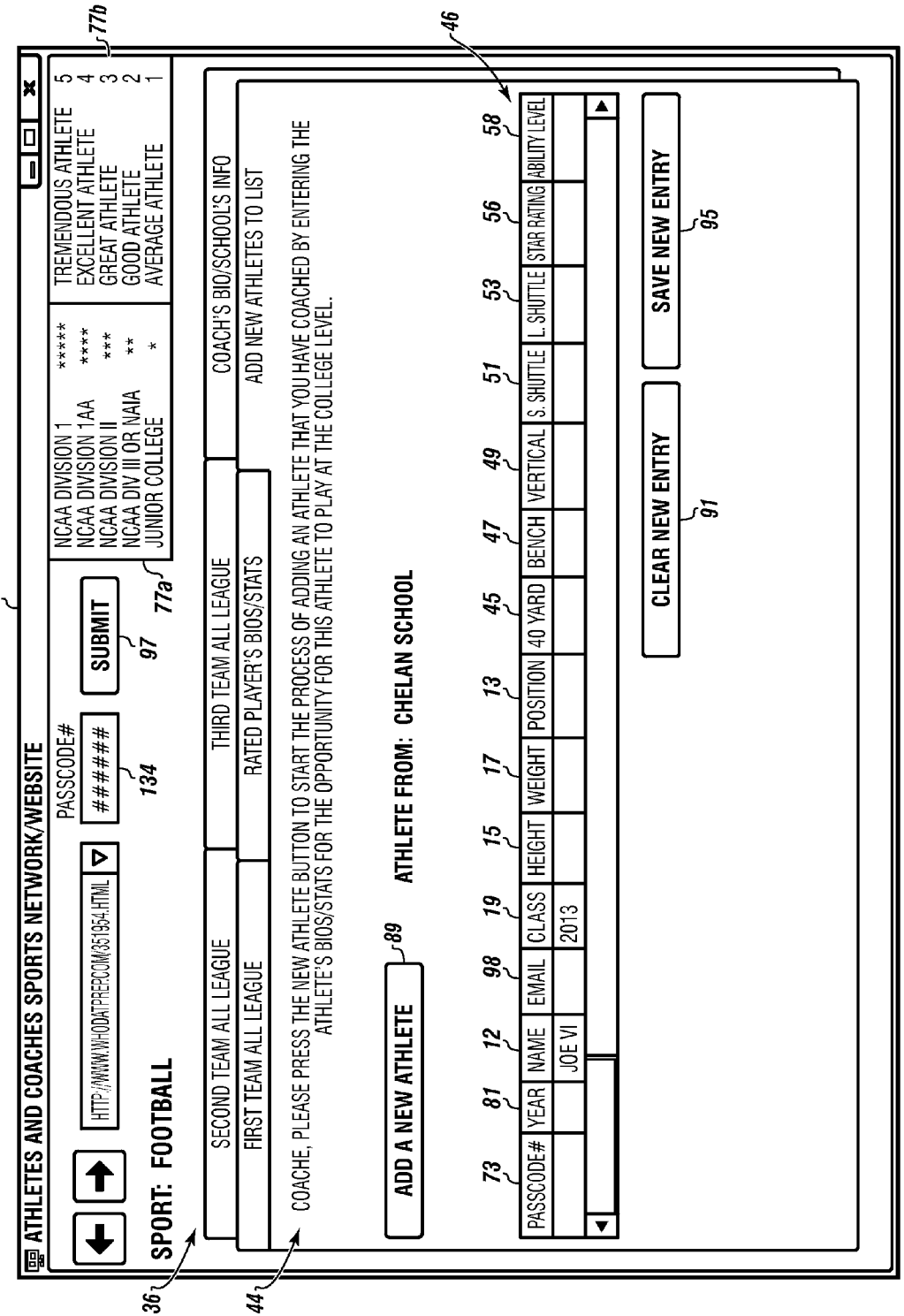
FIG. 5 depicts an embodiment of the coach profile having an add new athlete portion, allowing the coaches to add new sports players into the library of league information.

FIG. 5 depicts an embodiment of the coach profile having an add new athlete portion to allow the coaches to add new sports players into the library of league information.

The add new athlete portion 44 can be presented within the coach profile 36 of the user interface 34.

The add new athlete portion 44 can be configured to receive new sports player information 46 for new sports players 12 to be added into the library of league information.

The new sports player information 46 can be input by a coach via the client device and user interface 34; thereby allowing the coach to add the new sports player 12 to the lists of sports players in the first team, second team, and third team.

The new sports player information 46 that can be added can include the sports player contact information 98, graduation class year 19, height 15, weight 17, sports player position 13, forty yard dash 45, maximum bench press weight 47, vertical jump test distance 49, short shuttle test time 51, long shuttle test time 53, and any other sports player information described herein.

The add new athlete portion 44 can also allow the coaches to add star rating 56 and ability level 58.

The add new athlete portion 44 can include an add new athlete button 89 configured to be selected by the coach via the user interface 34 for adding the new sports player 12 into the library of league information.

The add new athlete portion 44 can include a clear new entry button 91 configured to be selected by the coach using via the user interface 34 for deleting an athlete from a list of athletes to be added before the list of athletes are added.

The add new athlete portion 44 can include a save new entry button 95 configured to be selected by the coach via the user interface 34 for saving the newly added athletes into the library of league information.

In operation, after the new sports player 12 has been added into the library of league information, the processor can automatically generate the sports player passcode 73 and the date 81 the sports players was added, such as the year.

The processor can also automatically transmit a message to other coaches within the associated league requesting the other coaches to provide a rating, ability level, and comments on that newly added sports player 12.

The legends 77a and 77b, coach passcode 134, and coach submit button 97 can be presented along with the add new athlete portion 44.

FIG. 6 depicts an embodiment of a coach biography and school information portion of the coach profile configured to allow school information to be input into the library of league information.

The coach biography and school information portion 38 can be presented within the coach profile 36 of the user interface 34.

The coach biography and school information portion 38 can be configured to receive school information for storage into the library of league information via the user interface 34.

The school information that can be input by the coaches via the user interface 34 can include: the school 28, league 24, state 26, classification or division 30, name of the coach 37, coach email address 39, coached sport 41, a school phone number 55, a name of the counselor 57, a counselor email address 59, a name of the athletic director 61, and an athletic director email address 63.

The school information that can be input by the coaches using the client device 20 and can also include a list of sports players that have played college sports 43 that are associated with the coach 37.

The list of sports players that have played college sports 43 can include the name of the sports players 12, the graduation class years 19, and a list of colleges 103 attended by the sports players 12.

The school information that can be input by the coaches via the user interface 34 can also include answers 71 to a series of questions 67 presented to the coach 37 for determining a power ranking of the coach 37. The user interface 34 can be configured to receive the answers 71 from the client device, and the processor can determine the power ranking of the coach 37 using the answers 71.

In one or more embodiments, the series of questions 67 can include: a request for an indication of how many years the coaches have coached, a request for an indication of how many years the coaches teams have been league champions, a request for an indication of how many years the coaches teams have been state champions, a request for an indication of a number of wins on record for the coaches, a request for an indication of a number of post-season or play-off wins on record for the coaches, a request for an indication of a number of seasons that the coaches have been head coaches, a request for an indication of a number of years that the coaches have played sports, a request for an indication of where or not the coaches played college sports, a request for an indication of whether or not the coaches have coached college sports, a request for an indication of whether or not the coaches have played professional sports, and a request for an indication of a number of past sports players coached by the coaches that are playing or have played college sports.

In operation, the coach 37 can input a numerical value for one or more of the series of questions 67 as the answers 71. For questions that are not answerable by numerical values, the processor can assign the associated answer a numerical value. For example, if a coach responds that he or she has played professional sports, the processor can assign a numerical value that is greater than 0 to that answer. If the coach responds that he or she has not played professional sports, the processor can assign a numerical value of 0 to that answer. The processor can determine the power ranking of the coach 37 by adding together each numerical value entered by the coach, each numerical assigned by the processor, or combinations thereof.

The coach biography and school information portion 38 can include a submit and save data button 101 configured to be selected by the coach 37 via the user interface 34 to save the school information into the library of league information.

The legends 77a and 77b, coach passcode 134, and coach submit button 97 can be presented along with the coach biography and school information portion 38.

FIG. 7 depicts an embodiment of a message to a counselor that can be provided by the system.

The message 100c, which can be an email, can be transmitted to a counselor at a school using a counselor email address 59 from the school contact information in the library of league information. If the counselor email address 59 is not in the library of league information, the message 100c can be transmitted to other personnel at the school requesting that the other personnel forward the message to the counselor.

The message 100c can include a request 146b for the counselor to access the user interface and input additional sports player information into the library of league information for sports players at the counselor's school that have been rated by coaches.

The message 100c can include an email link 126g, which can be selected by the counselor to allow the counselor to login to the user interface and use a counselor profile to input the additional sports player information into the library of league information.

The message 100c can also include an automatically generated counselor passcode 148, which can allow the counselor to login to the user interface.

FIG. 8 depicts an embodiment of a counselor profile that can be accessed by counselors at schools to add additional sports player information into the library of league information.

The counselor profile 138 can be presented in the user interface 34, and can include a listing of sports players 12 at the counselor's school that have been rated by coaches and the date 81 the sports players 12 were added, such as the year.

The counselor can input the counselor passcode 148 and a counselor password 149 to access the counselor profile 138.

The counselor can input each sport player's 12 graduation class year 19, class rank 21, grade point average 25, SAT score 27, ACT score 29, transcript 160, other academic data, or combinations thereof.

In operation, the counselor can select a counselor submit and save button 109 to save the additional sports player information into the library of league information.

FIG. 9 depicts an embodiment of a recruiters profile that can be accessed by college recruiters for searching for sports players in the library of league information that match criteria selected by the college recruiters.

The recruiter's profile 82 can be presented in the user interface 34 on the client device.

The recruiter's profile 82 can receive a recruiter passcode 85 and a recruiter password 87 for allowing access to the user interface 34 by the college recruiters.

The recruiter's profile 82 can include a college recruiter school name 116, a name of a college coach 118, and a college recruiter name 120.

The recruiter's profile 82 can include a search portion 86 configured to allow the college recruiters to search for sports players 12 by criteria 88.

The criteria 88 can include sports player position 13*a*, a minimum average rating 23*a*, state 26*a*, classification or division 30*a*, league 24*a*, and any other category of sports player information 46 described herein.

The criteria 88 can be configured to be a default criteria by selecting a default criteria option 141, or custom criteria by selecting a custom criteria option 143.

The college recruiters can use the user interface 34 to select the criteria 88 and then select a search button 140 to initiate a search. For example, the college recruiters can search for a quarterback having an average rating of at least 4.3 from all divisions in the state of Washington within the Caribou Trail league.

Upon selection of the search button 140, the processor can search the library of league information to form search results 90 based upon the criteria 88 selected by the college recruiters.

The search results 90 can be presented in the recruiter's profile 82, and can include the sports player information 46 for each sports player 12 in the search results 90.

The sports player information 46 can include various categories of information, including: names of the sports players 12, schools 28*a*, sports player position 13*b*, height 15, weight 17, graduation class year 19, class rank 21, average rating 23*b*, grade point average 25, SAT score 27, ACT score 29, uniform number 31, links linking to the one or more game videos 33, forty yard dash 45, maximum bench press weight 47, vertical jump test distance 49, short shuttle test time 51, long shuttle test time 53, sports played 65, state 26*b*, league 24*b*, associated classification or division 30*b*, other sports player statistics 72, or combinations thereof.

In operation, the search results 90 can be sortable by each categorized column of the sports player information 46 in the search results 90. For example, the college recruiters can select the column displaying the SAT scores 27 to sort the sports players 12 in the search results 90 from lowest to highest SAT score 27 or from highest to lowest SAT score 27.

Each sports player 12 in the search results 90 can be selected using via the user interface 34.

Upon selection of one of the sport players 12, a league coaches rating portion 92 can present a list of coaches 37*a* associated with the selected sports player.

The league coaches rating portion 92 can present the rating 56, ability level 58, comments 60 for the selected sports player provided by each of the coaches 37*a*, school 28*b* associated with the selected sports player, sports player position 13*c* associated with the selected sports player, the date 81 the sports players was added, and power rankings 69*a* for each of the coaches 37*a*.

The league coaches rating portion 92 can be sortable by each categorized column. For example, the college recruiters can use the client device and user interface 34 to select the column listing the power rankings 69*a* of the coaches 37*a* to sort the league coaches rating portion 92 from lowest to highest power ranking 69*a* or from highest to lowest power ranking 69*a*.

Each coach 37*a* can be selected via the user interface 34 to present coach information 42. For example, the coach information 42 can include the name of the selected coach 37*b*, the coach email address 39, the school 28*c* associated with the selected coach 37*b*, the power ranking 69*b* for the selected coach 37*b*, and answers 71*a*-71*h* provided by the selected coach 37*b*.

Upon selection of one of the sport players 12, the recruiters profile 82 can present coach contact information 96 and sports player contact information 98, such as a list of coach email addresses and sports player email address; thereby allowing the college recruiters to contact the coaches 37*a* and 37*b*, the sports players 12, or combinations thereof.

In one or more embodiments, the coach contact information 96 and the sports player contact information 98 can include the coach email addresses 39, coach telephone numbers, coach physical addresses, sports player email addresses, sports player telephone numbers, sports player physical addresses, or combinations thereof. As such, the recruiters profile 82 can allow the college recruiters to contact the coaches 37*a* and 37*b*, the sports players 12, or combinations thereof via email, telephone, text messaging, postal mail, or combinations thereof using the client devices and the user interface 34.

For example, the college recruiters can use the client device and user interface 34 to select a contact coaches button 142 to transmit an email or text message, initiate a telephone call, or print an automated letter for postal delivery to the coaches 37*a* and 37*b* to request more information about the selected sports player, to ask specific questions about the selected sports player, or the like.

The college recruiters can use the client device and user interface 34 to select a contact sports players button 144 to transmit an email or text message, initiate a telephone call, or print an automated letter for postal delivery to the selected sports player to request information, ask questions, initiate recruitment, or the like.

The recruiter's profile 82 can include a favorites selector 93, which can be selected by the college recruiters using the client device and user interface 34 to add sports players 12 from the search results 90 to a favorites list 94.

Figure 10A:
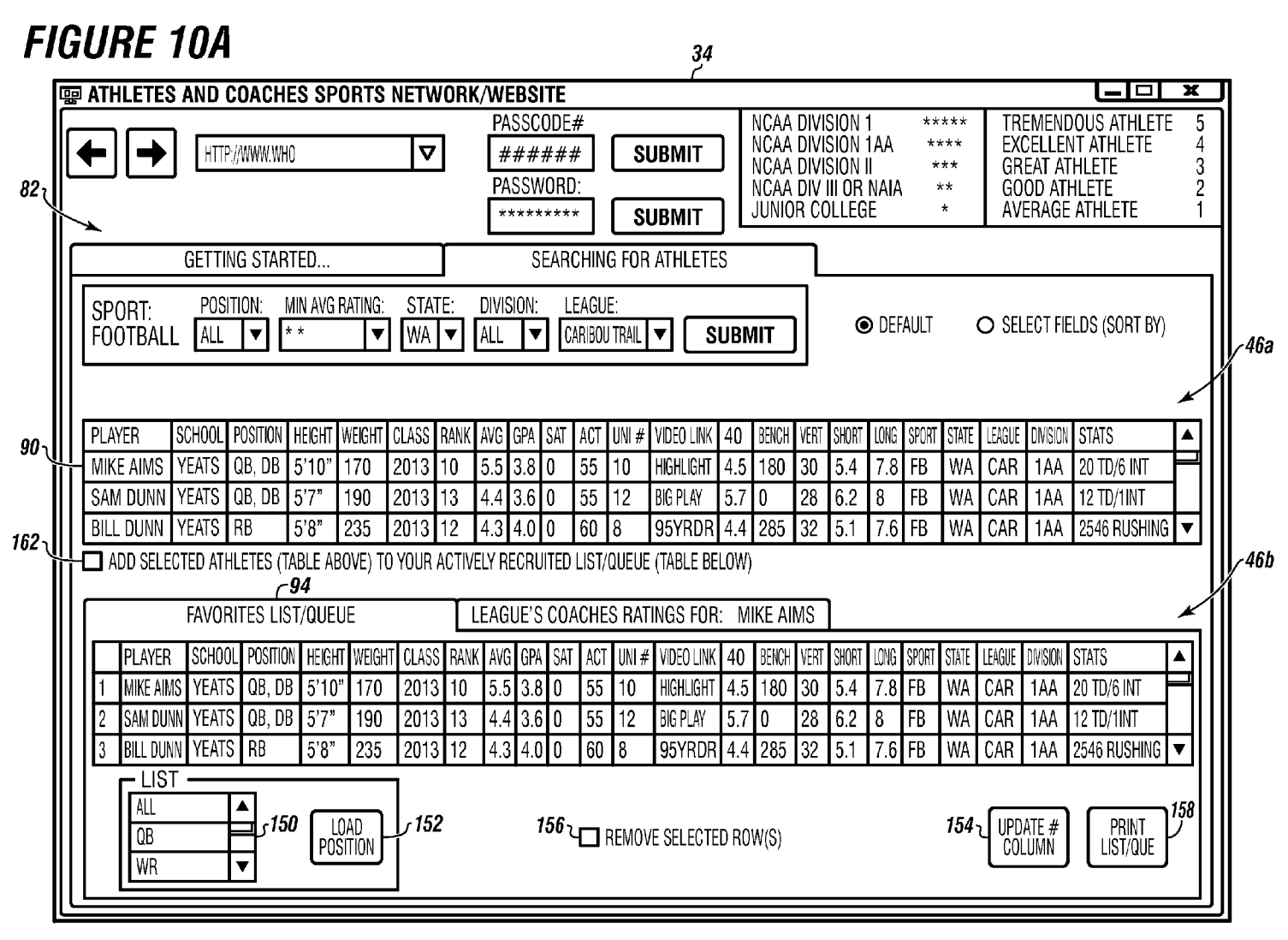

FIG. 10A depicts an embodiment of the recruiters profile with the favorites list opened.

The recruiter's profile 82 can be presented in the user interface 34 on the client device.

The favorites list 94 can be presented in the recruiter's profile 82, and can be updatable. For example, the recruiter's profile 82 can include an update button 154. The college recruiters can select rows in the favorites list 94, select a remove selected rows selector 156, and select the update button 154 to initiate computer instructions to instruct the processor to remove the sports players in the selected rows from the favorites list 94; thereby updating the favorites list 94.

The favorites list 94 can be sortable by various categories of sports player information 46*b*, which can be the same categories of sports player information 46*a* as are in the search results 90.

The favorites list 94 can be controlled by the college recruiters to only present sports players that play a particular position. For example, the college recruiters can use a position selector 150 to select a particular position, and can then use a load position button 152 to initiate computer instructions to instruct the processor to present sports players that have been added to the favorites list and play the particular position.

The recruiter's profile 82 can also include a print list button 158, allowing the college recruiters to print the favorites list 94.

The recruiters profile 82 can also include an actively recruited selector 162 configured to allow the college recruiters to added sports players from the favorites list 94 to an actively recruited list.

Figure 10B:
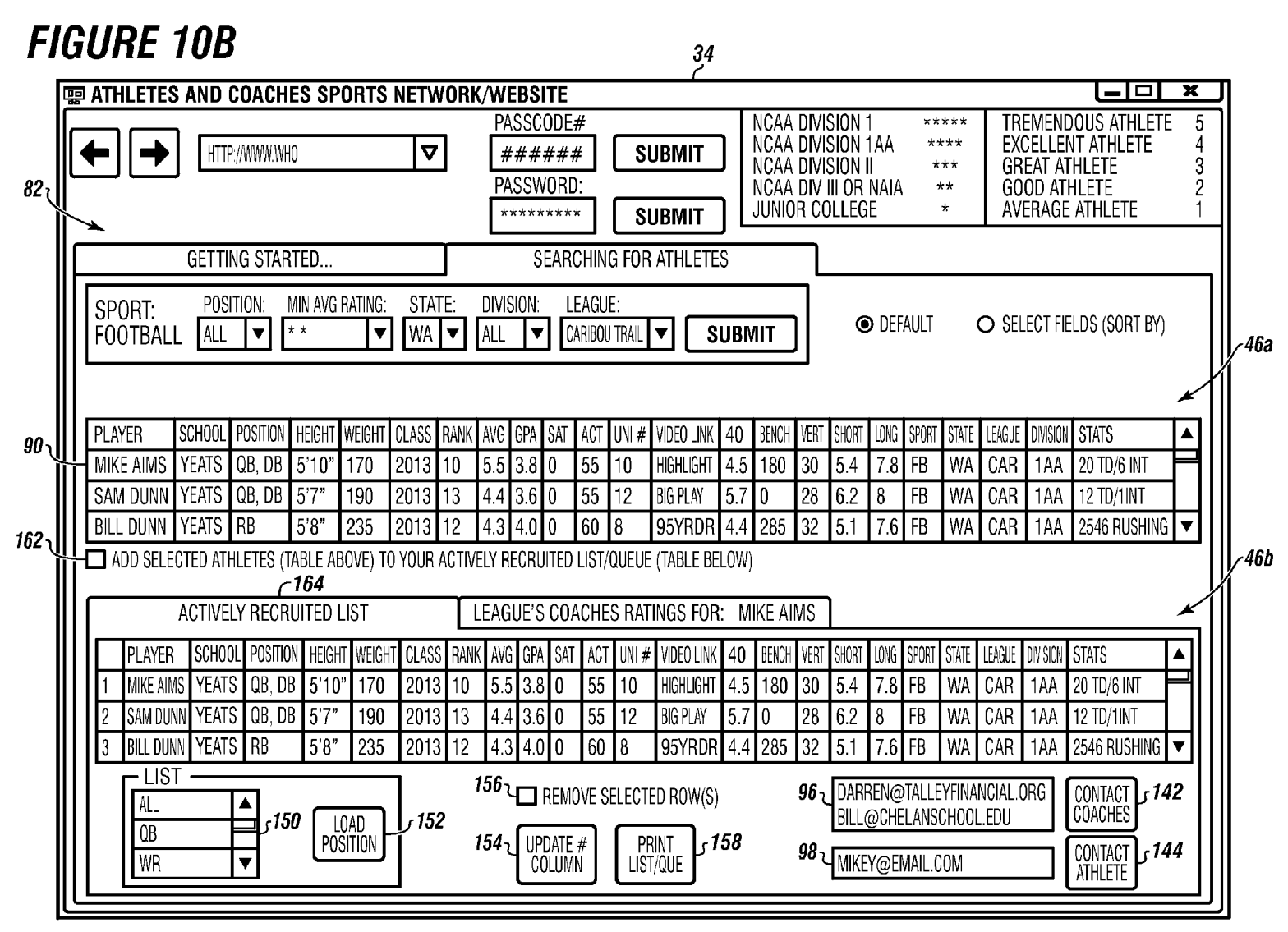

FIG. 10B depicts an embodiment of the recruiters profile showing an actively recruited list.

The recruiter's profile 82 can be configured to allow the college recruiters to form an actively recruited list 164 from the favorites list for presentation therein.

The actively recruited list 164 can present sports player information 46b, including a list of sports players that a college recruiter has selected from the favorites list for active recruitment using the actively recruited selector 162. The sports player information 46b can be the same as the sports player information 46a presented in the search results 90.

The actively recruited list 164 can be updatable and sortable in the same manner as the favorites list as described herein. For example, the actively recruited list 164 can include the update button 154, the "remove selected rows selector" 156, the position selector 150, the load position button 152, and the print list button 158.

The recruiters profile 82 can be configured to allow the college recruiters to use the actively recruited list 164 to select the contact coaches button 142 and the contact sports players button 144 for contacting the coaches, the sports players 12, or combinations thereof via email, telephone, text messaging, postal mail, or combinations thereof.

For example, if a college recruiter wants to initiate recruitment of a particular sports player listed in the sports player information 46b, the college recruiter can select the particular sports player to initiate presentation of the coach contact information 96 and the sports player contact information 98.

The college recruiter can then select a desired portion of the coach contact information 96, sports player contact information 98, or both for generating an automatic or custom message to the coaches, particular sports player, or both.

For example, the college recruiter can select a sports player physical address portion of the sports player contact information 98, which can initiate computer instructions in the data storage to generate and transmit an automated letter or the like for mailing via postal mail, or can allow the college recruiter to produce a custom letter for mailing via postal mail.

The college recruiter can select a sports player telephone number portion of the sports player contact information 98, which can initiate computer instructions in the data storage to generate and transmit an automated text message or voice message to the sports player telephone number, or can allow the college recruiter to generated a custom text message, voice mail, or speak directly with the particular sports player through the user interface 34 over the network.

The college recruiter can select a sports player email address portion of the sports player contact information 98, which can initiate computer instructions in the data storage to generate and transmit an automated email message to the sports player email address or allow the college recruiter to generate a custom email for transmission to the sports player email address.

The college recruiter can similarly select portions of the coach contact information 96 for contacting one or more coaches of the particular sports player.

FIG. 11 depicts an embodiment of a sports player profile that can be accessed by the sports players to track recruitment activities associated with that sports player and to upload pictures and game videos.

The sports player profile 66 can be presented within the user interface 34 on the client device.

The sports player profile 66 can be configured to receive the sports player passcode 73 and a sports player password 104 via the user interface 34 to allow the sports players to access and view the sports player profile 66.

The sports player profile 66 can include an invite friend portion 106 configured to receive an email address of a friend of the associated sports player, allowing the processor to transmit a message to the email address of the friend to invite the friend to view the associated sports player profile 66.

The sports player profile 66 can include one or more photos 68 that can be uploaded by the sports players, allowing the college recruiters to see the sports players.

The sports player profile 66 can include one or more game videos 33 that can be uploaded by the sports players, allowing the college recruiters to watch videos of sports games that the sports players have played in.

The sports player profile 66 can include a game highlights video 105 that can be uploaded by the sports player 12, allowing the college recruiters to watch video highlights of the sports player's best plays, which can be selected by the sports player.

The sports player profile 66 can include a list of colleges 103 that the associated sports player is interested in attending. The list of colleges 103 can be input by the associated sports player.

The sports player profile 66 can include a save all button 107 configured to be selected by the sports players using the user interface 34 for saving the photos 68, game videos 33, game highlights video 105, the list of colleges 103, or combinations thereof.

The sports player profile 66 can include sports player information 46a-46b, which can be provided by the coaches, counselors, and the like that are associated with the sports player.

The sports player profile 66 can include a search tracker 74 displaying a list of colleges that have searched for the sports player, a number of times each college has searched for the sports player, and a total number of times the sports player has been searched.

The sports player profile 66 can include a contact tracker 76 displaying a list of colleges that have contacted the associated sports player, a number of times each college has contacted the sports player, and a total number of times the sports player has been contacted.

The sports player profile 66 can include a favorites tracker 78 displaying a list of colleges that have added the sports player to a favorites list, a number of times each college has added the sports player to a favorites list, and a total number of times the sports player has been added to a favorites list.

The sports player profile 66 can include a viewed videos tracker 80 displaying a list of colleges that have viewed the associated sports player's game videos 33, game highlights video 105, or combinations thereof; a number of times each college has viewed the associated sports player's game videos 33, game highlights video 105, or combinations thereof; and a total number of times the sports player's game videos 33, game highlights video 105, or combinations thereof have been viewed.

The sports player profile 66 can an actively recruited tracker 170 displaying a list of colleges that have added the associated sports player to an actively recruited list, a number of times each college has added the associated sports player to an actively recruited list, and total number of times the associated sports player has been added to an actively recruited list.

Figure 12C:
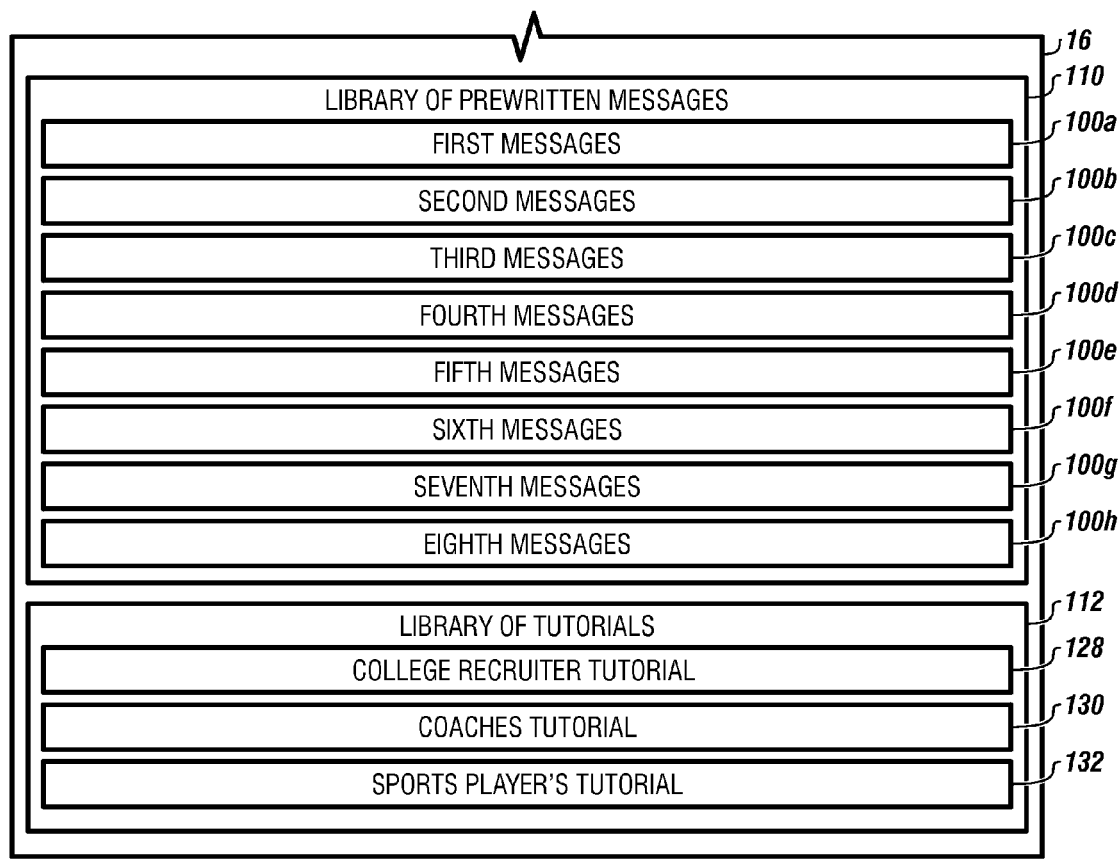
Figure 13A:
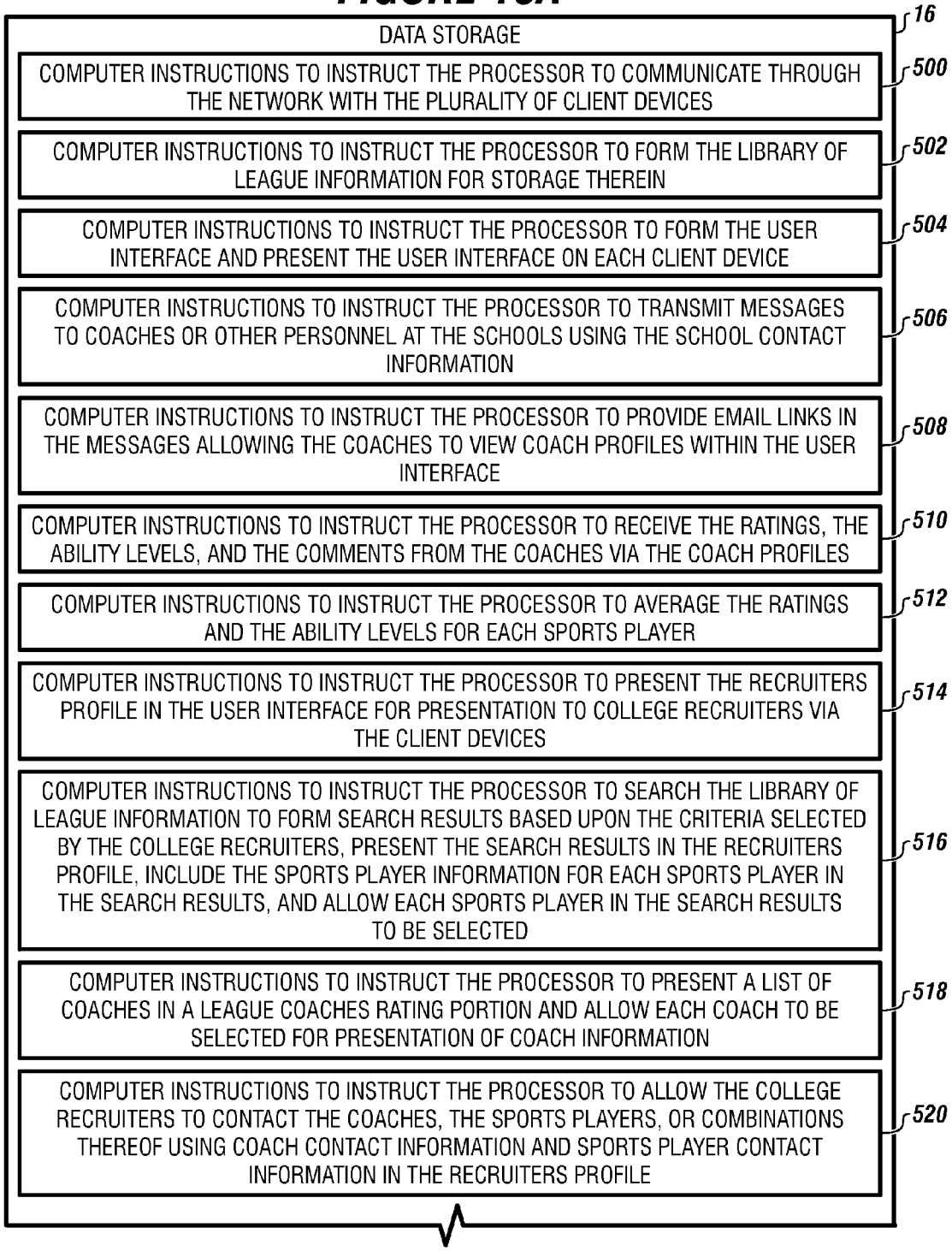
FIGS. 13A-13F depict an embodiment of the data storage having computer instructions stored therein.
Figure 13B:
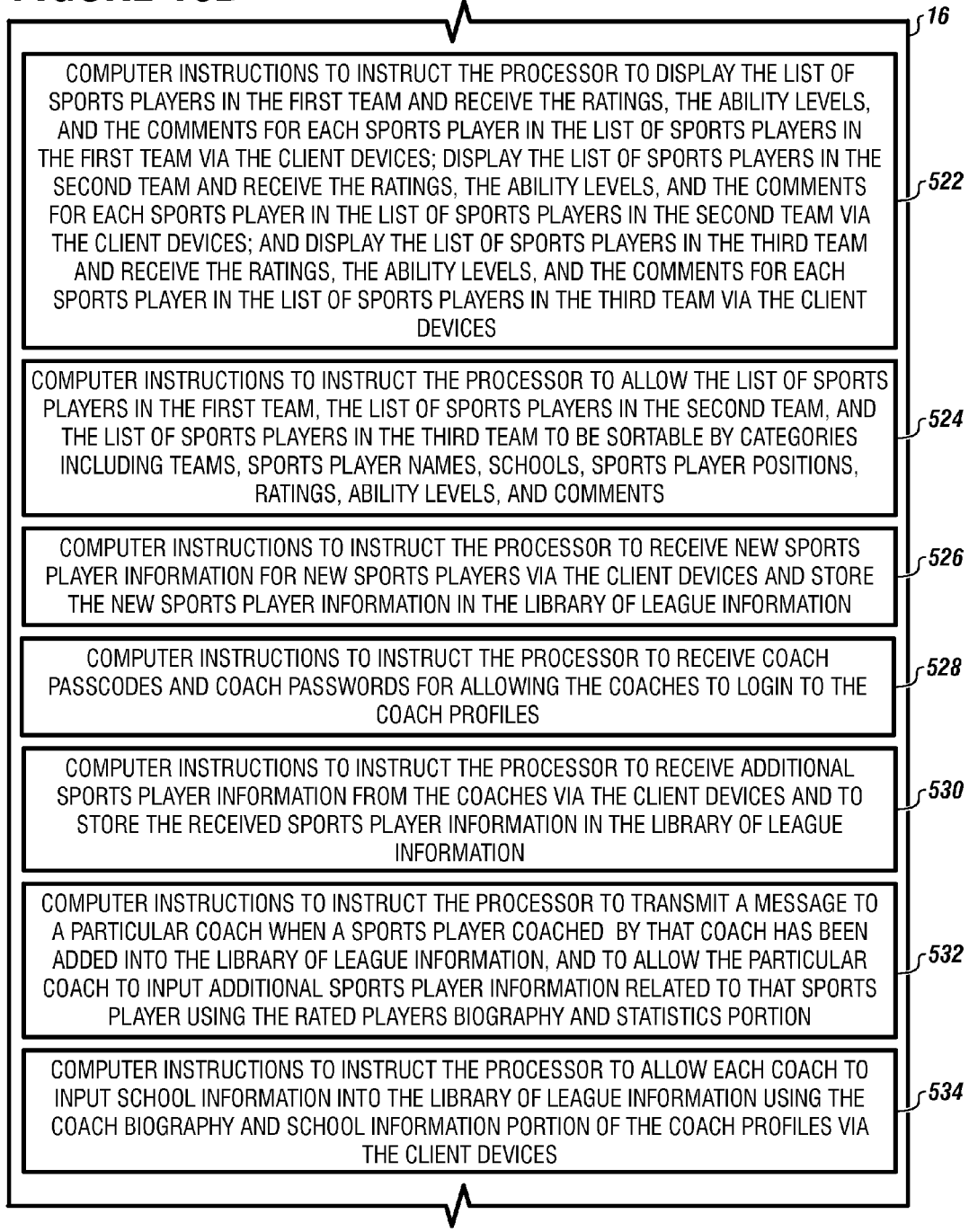
Figure 13C:
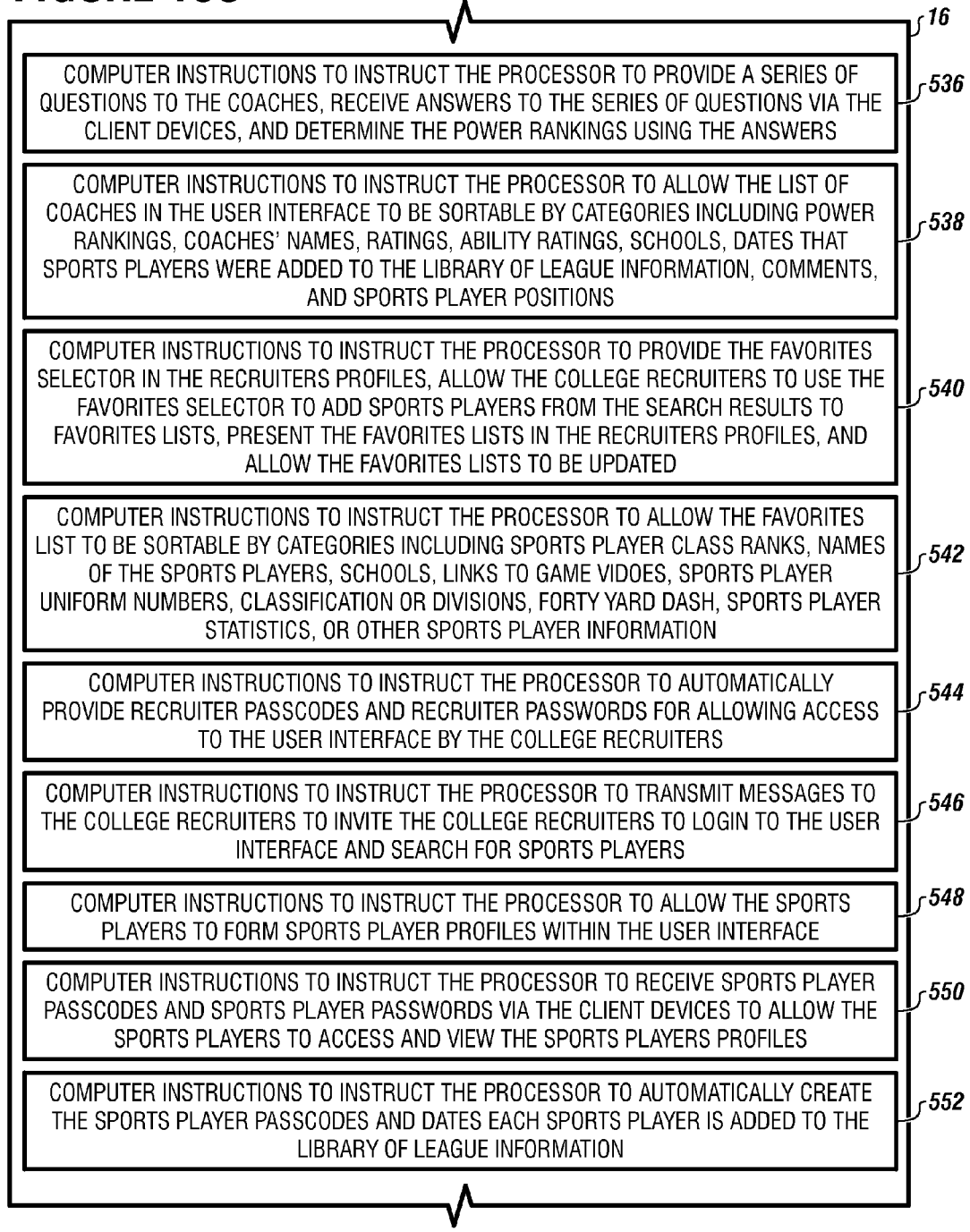
Figure 13D:
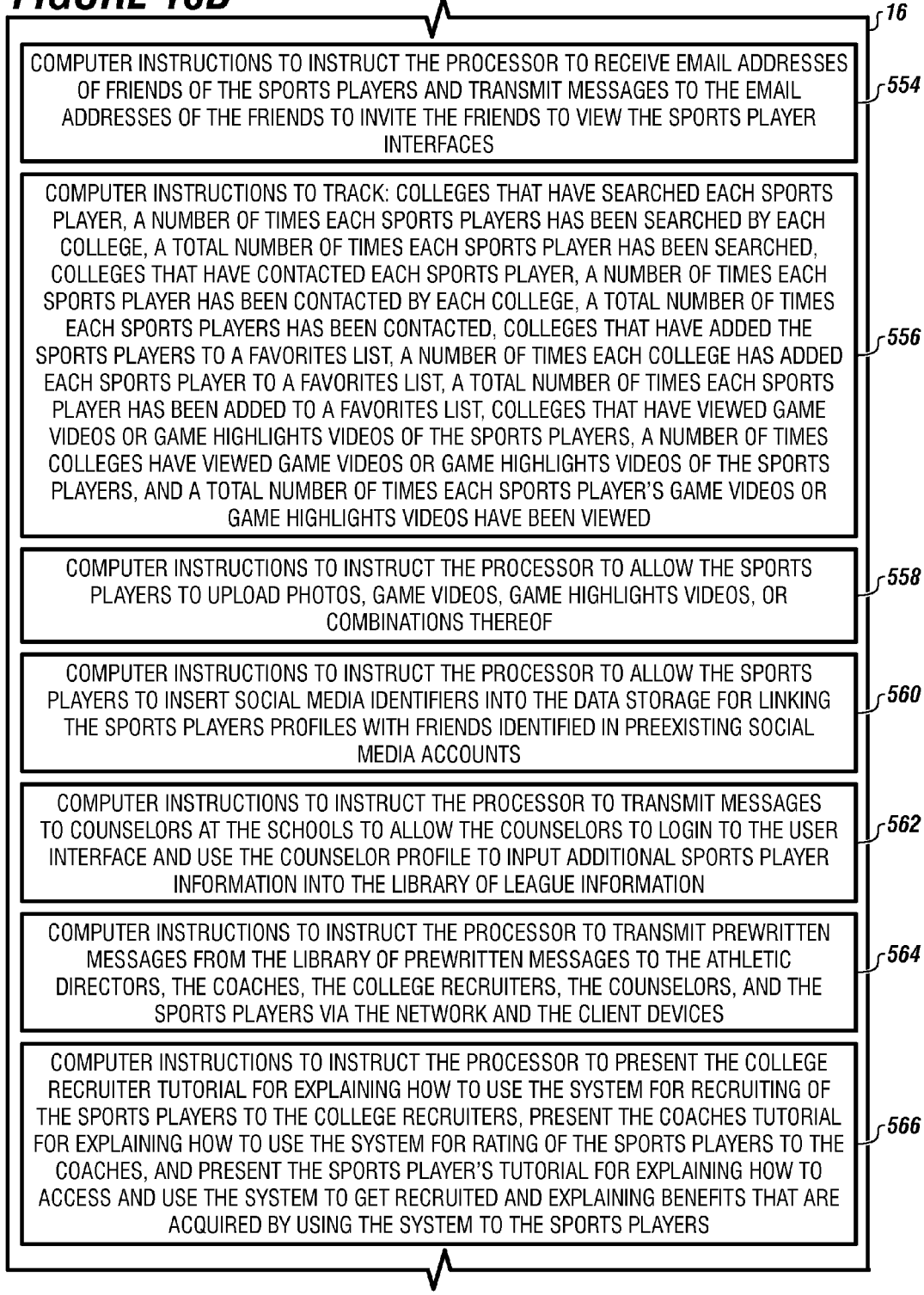
Figure 13E:
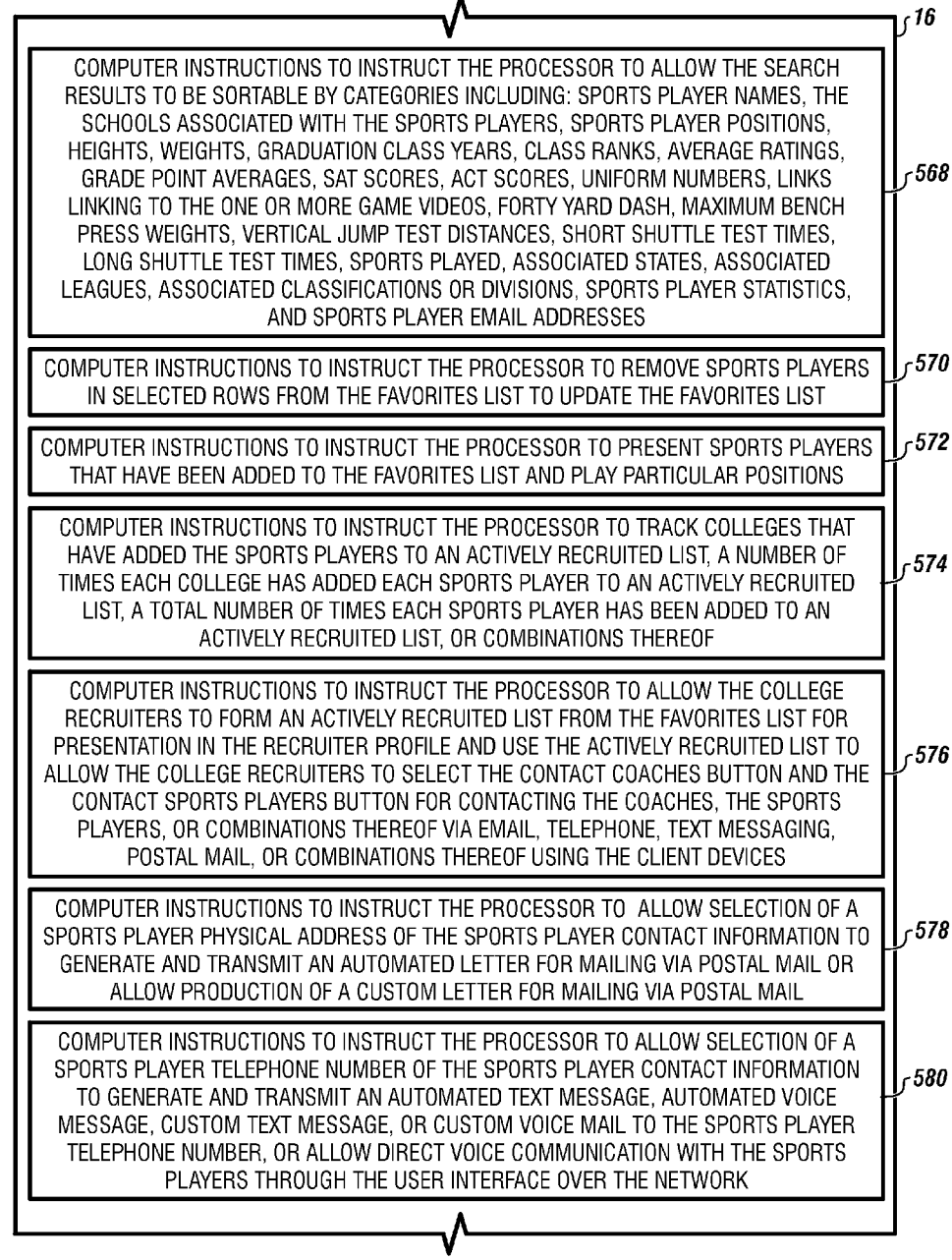
Figure 13F:
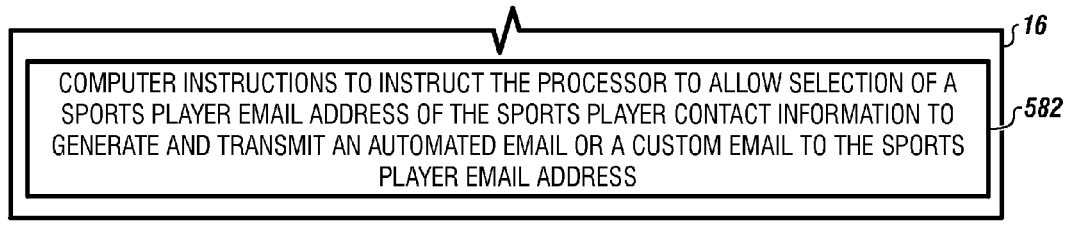

FIGS. 12A, 12B, and 12C depict an embodiment of the data storage including a library of league information, a library of prewritten messages, and a library of tutorials.

The library of league information 22 can be stored in the data storage 16, and can include names of leagues 24, states 26 in which each league 24 resides, schools 28 attended by the sports players in each league 24, classifications or divisions 30 for each school 28, and school contact information 32.

The library of league information 22 can include sports player information 46.

The sports player information 46 can include: number of sports played and associated data 9, sports player names 11, sports player positions 13, heights 15, weights 17, graduation class years 19, class ranks 21, average ratings 23, grade point averages 25, SAT scores 27, ACT scores 29, uniform numbers 31, game videos 33, forty yard dash 45 times, maximum bench press weights 47, vertical jump test distances 49, short shuttle test times 51, long shuttle test times 53, sports played 65, other sports player statistics 72, sports player email addresses 75, photos 68, and game highlights videos 105.

The library of league information 22 can include school information 40. The school information 40 can include a school phone number 55, a name of counselor 57, a counselor email address 59, an athletic director name 61, an athletic director email address 63, a name of coach 37, a coach email address 39, a coached sport 41, a list of sports players that have played college sports 43 that were coached by the associated coach, a series of questions 67, answers 71, and power rankings 69.

The library of league information 22 can include other coach information 42, other coach contact information 96, and other sports player contact information 98 stored therein.

The library of prewritten messages 110 can be stored in the data storage 16 and can include first messages 100a for transmission to coaches or other personnel for receiving ratings, ability levels, and comments.

The library of prewritten messages 110 can include second messages 100b for transmission to the college recruiters, third messages 100c for transmission to the sports players, fourth messages 100d for transmission to the coaches for submittal of additional sports player information, and fifth messages 100e for transmission to the coaches to provide thanks the coaches for submitting the additional sports player information and rating the sports players.

The library of prewritten messages 110 can include sixth messages 100f for transmission to particular coaches when sports players coached by the particular coaches have been added into the library of league information 22 to allow the particular coaches to input additional sports player information related to the sports players.

The library of prewritten messages 110 can include seventh messages 100g for transmission to email addresses of friends of sports players to invite the friends to view the associated sports player profiles.

The library of prewritten messages 110 can include eighth messages 100h for transmission to counselors at the schools to allow the counselors to login to the user interface and use counselor profiles to input additional sports player information into the library of league information 22.

The library of tutorials 112 can be stored in the data storage 16 and can include a college recruiter tutorial 128 for explaining how to use the system for recruiting of the sports players to the college recruiters, a coaches tutorial 130 for explaining how to use the system for rating of the sports players to the coaches, and a sports player's tutorial 132 for explaining how to access and use the system to get recruited and explaining benefits that are acquired by using the system to the sports players.

Each tutorial in the library of tutorials 112 can provide instructions on how to use the user interface and functions thereof.

FIGS. 13A-13F depict an embodiment of the data storage having computer instructions stored therein.

The data storage 16 can include computer instructions to instruct the processor to communicate through the network with the plurality of client devices 500.

The data storage 16 can include computer instructions to instruct the processor to form the library of league information for storage therein 502.

The data storage 16 can include computer instructions to instruct the processor to form the user interface and present the user interface on each client device 504.

The data storage 16 can include computer instructions to instruct the processor to transmit messages to coaches or other personnel at the schools using the school contact information 506.

The data storage 16 can include computer instructions to instruct the processor to provide email links in the messages allowing the coaches to view coach profiles within the user interface 508.

The data storage 16 can include computer instructions to instruct the processor to receive the ratings, the ability levels, and the comments from the coaches via the coach profiles 510.

The data storage 16 can include computer instructions to instruct the processor to average the ratings and the ability levels for each sports player 512.

The data storage 16 can include computer instructions to instruct the processor to present the recruiters profile in the user interface for presentation to college recruiters via the client devices 514.

The data storage 16 can include computer instructions to instruct the processor to search the library of league information to form search results based upon the criteria selected by the college recruiters, present the search results in the recruiters profile, include the sports player information for each sports player in the search results, and allow each sports player in the search results to be selected 516.

The data storage 16 can include computer instructions to instruct the processor to present a list of coaches in a league coaches rating portion and allow each coach to be selected for presentation of coach information 518.

The data storage 16 can include computer instructions to instruct the processor to allow the college recruiters to contact the coaches, the sports players, or combinations thereof using coach contact information and sports player contact information in the recruiter's profile 520.

The data storage 16 can include computer instructions to instruct the processor to display the list of sports players in the first team and receive the ratings, the ability levels, and the comments for each sports player in the list of sports players in the first team via the client devices; display the list of sports players in the second team and receive the ratings, the ability levels, and the comments for each sports player in the list of sports players in the second team via the client devices; and display the list of sports players in the third team and receive the ratings, the ability levels, and the comments for each sports player in the list of sports players in the third team via the client devices 522.

The data storage 16 can include computer instructions to instruct the processor to allow the list of sports players in the first team, the list of sports players in the second team, and the list of sports players in the third team to be sortable by categories including teams, sports player names, schools, sports player positions, ratings, ability levels, and comments 524.

The data storage 16 can include computer instructions to instruct the processor to receive new sports player information for new sports players via the client devices and store the new sports player information in the library of league information 526.

The data storage 16 can include computer instructions to instruct the processor to receive coach passcodes and coach passwords for allowing the coaches to login to the coach profiles 528.

The data storage 16 can include computer instructions to instruct the processor to receive additional sports player information from the coaches via the client devices and to store the received sports player information in the library of league information 530.

The data storage 16 can include computer instructions to instruct the processor to transmit a message to a particular coach when a sports player coached by that coach has been added into the library of league information, and to allow the particular coach to input additional sports player information related to that sports player using the rated players biography and statistics portion 532.

The data storage 16 can include computer instructions to instruct the processor to allow each coach to input school information into the library of league information using the coach biography and school information portion of the coach profiles via the client devices 534.

The data storage 16 can include computer instructions to instruct the processor to provide a series of questions to the coaches, receive answers to the series of questions via the client devices, and determine the power rankings using the answers 536.

The data storage 16 can include computer instructions to instruct the processor to allow the list of coaches in the user interface to be sortable by categories including power rankings, coaches' names, ratings, ability ratings, schools, dates that sports players were added to the library of league information, comments, and sports player positions 538.

The data storage 16 can include computer instructions to instruct the processor to provide the favorites selector in the recruiters profiles, allow the college recruiters to use the favorites selector to add sports players from the search results to favorites lists, present the favorites lists in the recruiters profiles, and allow the favorites lists to be updated 540.

The data storage 16 can include computer instructions to instruct the processor to allow the favorites list to be sortable by categories including sports player class ranks, names of the sports players, schools, links to game videos, sports player uniform numbers, classification or divisions, forty yard dash, sports player statistics, or other sports player information 542.

The data storage 16 can include computer instructions to instruct the processor to automatically provide recruiter passcodes and recruiter passwords for allowing access to the user interface by the college recruiters 544.

The data storage 16 can include computer instructions to instruct the processor to transmit messages to the college recruiters to invite the college recruiters to login to the user interface and search for sports players 546.

The data storage 16 can include computer instructions to instruct the processor to allow the sports players to form sports player profiles within the user interface 548.

The data storage 16 can include computer instructions to instruct the processor to receive sports player passcodes and sports player passwords via the client devices to allow the sports players to access and view the sports players' profiles 550.

The data storage 16 can include computer instructions to instruct the processor to automatically create the sports player passcodes and dates each sports player is added to the library of league information 552.

The data storage 16 can include computer instructions to instruct the processor to receive email addresses of friends of the sports players and transmit messages to the email addresses of the friends to invite the friends to view the sports player interfaces 554.

The data storage 16 can include computer instructions in the data storage 16 to track: colleges that have searched each sports player, a number of times each sports players has been searched by each college, a total number of times each sports player has been searched, colleges that have contacted each sports player, a number of times each sports player has been contacted by each college, a total number of times each sports players has been contacted, colleges that have added the sports players to a favorites list, a number of times each college has added each sports player to a favorites list, a total number of times each sports player has been added to a favorites list, colleges that have viewed game videos or game highlights videos of the sports players, a number of times colleges have viewed game videos or game highlights videos of the sports players, and a total number of times each sports player's game videos or game highlights videos have been viewed 556.

The data storage 16 can include computer instructions to instruct the processor to allow the sports players to upload photos, game videos, game highlights videos, or combinations thereof 558.

The data storage 16 can include computer instructions to instruct the processor to allow the sports players to insert social media identifiers into the data storage for linking the sports players' profiles with friends identified in preexisting social media accounts 560.

The data storage 16 can include computer instructions to instruct the processor to transmit messages to counselors at the schools to allow the counselors to login to the user interface and use the counselor profile to input additional sports player information into the library of league information 562.

The data storage 16 can include computer instructions to instruct the processor to transmit prewritten messages from the library of prewritten messages to the athletic directors, the coaches, the college recruiters, the counselors, and the sports players via the network and the client devices 564.

The data storage 16 can include computer instructions to instruct the processor to present the college recruiter tutorial for explaining how to use the system for recruiting of the sports players to the college recruiters, present the coaches tutorial for explaining how to use the system for rating of the sports players to the coaches, and present the sports player's tutorial for explaining how to access and use the system to get recruited and explaining benefits that are acquired by using the system to the sports players 566.

The data storage 16 can include computer instructions to instruct the processor to allow the search results to be sortable by categories including: sports player names, the schools associated with the sports players, sports player positions, heights, weights, graduation class years, class ranks, average ratings, grade point averages, SAT scores, ACT scores, uniform numbers, links linking to the one or more game videos, forty yard dash, maximum bench press weights, vertical jump test distances, short shuttle test times, long shuttle test times, sports played, associated states, associated leagues, associated classifications or divisions, sports player statistics, and sports player email addresses 568.

The data storage 16 can include computer instructions to instruct the processor to remove sports players in selected rows from the favorites list to update the favorites list 570.

The data storage 16 can include computer instructions to instruct the processor to present sports players that have been added to the favorites list and play particular positions 572.

The data storage 16 can include computer instructions to instruct the processor to track colleges that have added the sports players to an actively recruited list, a number of times each college has added each sports player to an actively recruited list, a total number of times each sports player has been added to an actively recruited list, or combinations thereof 574.

The data storage 16 can include computer instructions to instruct the processor to allow the college recruiters to form an actively recruited list from the favorites list for presentation in the recruiter profile and use the actively recruited list to allow the college recruiters to select the contact coaches button and the contact sports players button for contacting the coaches, the sports players, or combinations thereof via email, telephone, text messaging, postal mail, or combinations thereof using the client devices 576.

The data storage 16 can include computer instructions to instruct the processor to allow selection of a sports player physical address of the sports player contact information to generate and transmit an automated letter for mailing via postal mail or allow production of a custom letter for mailing via postal mail 578.

The data storage 16 can include computer instructions to instruct the processor to allow selection of a sports player telephone number of the sports player contact information to generate and transmit an automated text message, automated voice message, custom text message, or custom voice mail to the sports player telephone number, or allow direct voice communication with the sports players through the user interface over the network 580.

The data storage 16 can include computer instructions to instruct the processor to allow selection of a sports player email address of the sports player contact information to generate and transmit an automated email or a custom email to the sports player email address 582.

While these embodiments have been described with emphasis on the embodiments, it should be understood that within the scope of the appended claims, the embodiments might be practiced other than as specifically described herein.

What is claimed is:

1. A system for recruiting and rating sports players, the system comprising:
  a processor in communication with a data storage and a network, wherein the processor is in communication through the network with a plurality of client devices;
  a library of league information stored in the data storage, wherein the library of league information comprises: names of leagues, states in which each league resides, schools attended by the sports players in each league, a classification or division for each school, and school contact information;
  computer instructions in the data storage to form a user interface and present the user interface on each client device;
  computer instructions in the data storage to transmit messages to coaches or other personnel at the schools using the school contact information, wherein the messages comprise requests for the coaches to provide ratings, ability levels, and comments for each sports player in the leagues associated with the coaches, wherein the messages further comprise links allowing the coaches to view coach profiles within the user interface, and wherein the coach profiles are configured to receive the ratings, the ability levels, and the comments from the coaches;
  computer instructions in the data storage to average the ratings and the ability levels for each sports player;
  computer instructions in the data storage to present a recruiter profile in the user interface for presentation to college recruiters via the client devices, wherein the recruiter profile is configured to:
    allow the college recruiters to search for sports players by criteria, wherein computer instructions in the data storage search the library of league information to form search results based upon the criteria, and wherein the search results are presented in the recruiter profile and include sports player information for each sports player in the search results;
    present a list of coaches associated with a selected sports player from the search results;
    present the ratings, the ability levels, and the comments for the selected sports player provided by each coach in the list the coaches;
    present coach information associated with the coaches in the list of coaches; and
    present coach contact information and sports player contact information, allowing the college recruiters to contact the coaches, the sports players, or combinations thereof; and
  computer instructions in the data storage to allow each coach or other personnel at the schools to input school information into the library of league information using a coach biography and school information portion of the coach profiles, wherein the coach biography and school information portion is configured to receive the school information via the client devices and user interface;
  wherein the school information comprises: names of the schools, the leagues, the states, the classifications or divisions, school phone numbers, names of counselors, counselor email addresses, names of athletic directors, athletic director email addresses, names of the coaches, coach email addresses, coached sports, lists of all sports players coached by the coaches that have played college sports, and a series of questions presented to the coaches for determining a power ranking for the coaches, wherein the user interface is configured to receive answers to the series of questions via the client devices, and wherein the data storage further comprises computer instructions to determine the power rankings using the answers; and
  wherein the series of questions comprises: a request for an indication of how many years the coaches have coached; a request for an indication of how many years the coaches' teams have been league champions; a request for an indication of how many years the coaches' teams have been state champions; a request for an indication of a number of wins on record for the coaches; a request for an indication of a number of post-season or play-off wins on record for the coaches; a request for an indication of a number of seasons that the coaches have been head coaches; a request for an indication of a number of years that the coaches have played sports; a request for an indication of where the coaches played college sports at; and a request for an indication of a number of past sports players coached by the coaches that are playing or have played college sports.

2. The system of claim 1, wherein the recruiter profile further comprises:
  a search portion configured to allow the college recruiters to search for sports players by the criteria, wherein each sports player in the search results is selectable; and
  a league coaches rating portion for presenting the list of coaches associated with the selected sports player, presenting the ratings, presenting the ability levels, and presenting the comments for the selected sports player provided by each coach in the list the coaches, wherein each coach in the list of coaches is selectable, and wherein the recruiter profile presents the coach information upon selection of one of the coaches.

3. The system of claim 2, wherein the league coaches rating portion further comprises: names of the coaches, power rankings for the coaches, the schools of the sports player that has been selected, a date that the sports player that has been selected was added to the library of league information, and the sports player position of the sports player that has been selected, and wherein the data storage further comprises computer instructions to allow the list of coaches to be sortable by: the power rankings, the names of the coaches, the ratings, the ability levels, the schools, the date, the comments, and the sports player positions.

4. The system of claim 1, wherein:
the coach contact information and the sports player contact information comprise: coach email addresses, coach telephone numbers, coach physical addresses, sports player email addresses, sports player telephone numbers, sports player physical addresses, or combinations thereof; and
the recruiter profile further comprises: a contact coaches button and a contact sports players button, allowing the college recruiters to contact the coaches, the sports players, or combinations thereof via email, telephone, text messaging, postal mail, or combinations thereof using the client devices and the user interface by selecting the contact coaches button and the contact sports players button.

5. The system of claim 1, wherein:
the coach profiles further comprise:
a first team portion configured to display a list of sports players in a first team for an associated league, wherein the coach profiles are configured to receive the ratings, the ability levels, and the comments for each sports player in the list of sports players in the first team from the coaches via the client devices and the user interface;
a second team portion configured to display a list of sports players in a second team for the associated league, wherein the coach profiles are configured to receive the ratings, the ability levels, and the comments for each sports player in the list of sports players in the second team from the coaches via the client devices and the user interface; and
a third team portion configured to display a list of sports players in a third team for the associated league, wherein the coach profiles are configured to receive the ratings, the ability levels, and the comments for each sports player in the list of sports players in the third team from the coaches via the client devices and the user interface; and
the data storage further comprises computer instructions to allow the list of sports players in the first team, the list of sports players in the second team, and the list of sports players in the third team to be sortable by teams, names of the sports players, the schools, sports player positions, the ratings, the ability levels, and the comments.

6. The system of claim 1, further comprising computer instructions in the data storage to receive new sports player information for new sports players via the client devices and the user interface, and to store the new sports player information in the library of league information, wherein the coach profiles further comprise an add new athlete portion configured to receive the new sports player information for the new sports players, wherein the new sports player information is input by the coaches via the client devices, thereby allowing the coaches to add the new sports players to the list of sports players in the first team, the list of sports players in the second team, and the list of sports players in the third team.

7. The system of claim 1, wherein the coach profiles further comprise coach login portions configured to receive coach passcodes and coach passwords for allowing the coaches to login to the coach profiles.

8. The system of claim 1, further comprising:
computer instructions to receive additional sports player information from the coaches via the client devices and to store the received additional sports player information in the library of league information; and
a rated players biography and statistics portion in the coach profiles configured to allow the coaches to enter the additional sports player information, wherein the rated players biography and statistics portion is sortable by categories of the sports player information.

9. The system of claim 8, further comprising computer instructions in the data storage to transmit a message to a particular coach when a sports player coached by the particular coach has been added into the library of league information, and to allow the particular coach to input the additional sports player information related to that sports player using the rated players biography and statistics portion.

10. The system of claim 1, wherein the lists of all sports players coached by the coaches that have played college sports comprises names of the sports players, graduation class years, and colleges attended by the sports players.

11. The system of claim 1, wherein the sports player information comprises: names of the sports players, the schools associated with the sports players, sports player positions, heights, weights, graduation class years, class ranks, average rating, grade point averages, SAT scores, ACT scores, uniform numbers, links to game videos, forty yard dash times, maximum bench press weights, vertical jump test distances, short shuttle test times, long shuttle test times, sports played, states associated with the sports players, leagues associated with the sports players, classifications or divisions associated with the sports players, other sports player statistics, sports player email addresses, or combinations thereof.

12. The system of claim 1, wherein:
each rating is a star rating comprising: one star to indicate that the sports player is rated for a junior college, two stars to indicate that the sports player is rated for an NCAA Division III college or an NAIA college, three stars to indicate that the sports player is rated for an NCAA Division II college, four stars to indicate that the sports player is rated for an NCAA Division IAA college, or five stars to indicate that the sports player is rated for an NCAA Division 1 college; and
each ability level comprises: one star to indicate that the sports player is an average level athlete within the rating for that sports player, two stars to indicate that the sports player is a good athlete within the rating for that sports player, three stars to indicate that the sports player is a great level athlete within the rating for that sports player, four stars to indicate that the sports player is an excellent level athlete within the rating for that sports player, or five stars to indicate that the sports player is a tremendous level athlete within the rating for that sports player.

13. The system of claim 1, wherein the user interface further comprises one or more legends providing explanations for each rating and each ability level.

14. The system of claim 1, wherein the recruiter profile further comprises a favorites selector, wherein the data storage further comprises computer instructions to allow the college recruiters to use the favorites selector to add sports players from the search results to a favorites list, wherein the favorites list is presented in the recruiter profile, and wherein the favorites list is updatable.

15. The system of claim 14, further comprising computer instructions in the data storage to allow the favorites list to be sortable by: class ranks, names of the sports players, schools, links to game videos, uniform numbers, classifications or divisions, forty yard dash times, sports player statistics, or other sports player information.

16. The system of claim 14, further comprising computer instructions in the data storage to allow the college recruiters to form an actively recruited list from the favorites list for presentation in the recruiter profile, wherein the actively recruited list is configured to allow the college recruiters to select a contact coaches button and a contact sports players button, allowing the college recruiters to contact the coaches, the sports players, or combinations thereof via email, telephone, text messaging, postal mail, or combinations thereof using the client devices.

17. The system of claim 1, wherein the criteria comprises: a sports player position, a minimum average rating, the state, the classification or division, the league, and a sport played, and wherein the criteria is default criteria or custom criteria.

18. The system of claim 1, further comprising: computer instructions in the data storage to automatically provide a recruiter passcode and a recruiter password for allowing access to the user interface by the college recruiters, wherein the recruiter profile further comprises a college recruiter school name, a name of a college coach, and a college recruiter name.

19. The system of claim 1, further comprising computer instructions in the data storage to transmit a message to the college recruiters to invite the college recruiters to login to the user interface and search for sports players, wherein the message comprises an email link to login to the user interface.

20. The system of claim 1, wherein the sports players are high school sports players or junior college sports players and the coaches are high school coaches or junior college coaches.

21. The system of claim 1, further comprising computer instructions in the data storage to allow each sports player to form a sports player profile within the user interface.

22. The system of claim 21, wherein the sports players profile is configured to receive a sports player passcode and a sports player password via the client devices to allow the sports players to access and view the sports player profiles, and wherein the data storage further comprises computer instructions to automatically create the sports player passcodes and a date each sports player is added to the library of league information.

23. The system of claim 21, wherein the sports player profile further comprises an invite friend portion configured to receive an email address of a friend of the associated sports player, and wherein the data storage further comprises computer instructions to transmit a message to the email address of the friend to invite the friend to view the associated sports player profile.

24. The system of claim 21, further comprising computer instructions in the data storage to track:
colleges that have searched each sports player, a number of times each sports players has been searched by each college, a total number of times each sports player has been searched, or combinations thereof;
colleges that have contacted each sports player, a number of times each sports player has been contacted by each college, a total number of times each sports players has been contacted, or combinations thereof;
colleges that have added the sports players to a favorites list, a number of times each college has added each sports player to a favorites list, a total number of times each sports player has been added to a favorites list, or combinations thereof;
colleges that have added the sports players to an actively recruited list, a number of times each college has added each sports player to an actively recruited, a total number of times each sports player has been added to an actively recruited, or combinations thereof;
colleges that have viewed game videos or game highlights videos of the sports players, a number of times colleges have viewed game videos or game highlights videos of the sports players, a total number of times each sports player's game videos or game highlights videos have been viewed, or combinations thereof; or
combinations thereof.

25. The system of claim 21, wherein the sports player profile further comprises:
one or more photos uploaded by the sports players, one or more game videos uploaded by the sports players, one or more game highlights videos uploaded by the sports player, or combinations thereof;
sports player statistics;
a list of colleges that the associated sports player is interested in, wherein the list of colleges is input by the associated sports player;
a search tracker displaying a list of colleges that have searched for the associated sports player, a number of times each college has searched for the associated sports player, a total number of times the associated sports player has been searched, or combinations thereof;
a contact tracker displaying a list of colleges that have contacted the associated sports player, a number of times each college has contacted the associated sports player, a total number of times the associated sports player has been contacted, or combinations thereof;
a favorites tracker displaying a list of colleges that have added the associated sports player to a favorites list, a number of times each college has added the associated sports player to a favorites list, a total number of times the associated sports player has been added to a favorites list, or combinations thereof;
an actively recruited tracker displaying a list of colleges that have added the associated sports player to an actively recruited list, a number of times each college has added the associated sports player to an actively recruited list, a total number of times the associated sports player has been added to an actively recruited list, or combinations thereof;
a viewed videos tracker displaying:
a list of colleges that have viewed the associated sports player's game videos, game highlights video, or combinations thereof;
a number of times each college has viewed the associated sports player's game videos, game highlights video, or combinations thereof;
a total number of times the associated sports player's game videos, game highlights video, or combinations thereof have been viewed; or
combinations thereof; or
combinations thereof.

26. The system of claim 21, further comprising computer instructions in the data storage to allow the sports players to insert social media identifiers into the data storage for linking the sports players profile with friends identified in a preexisting social media account.

27. The system of claim 1, further comprising computer instructions in the data storage to transmit messages to counselors at the schools, wherein the messages comprise email links to allow the counselors to login to the user interface and use a counselor profile to input additional sports player information into the library of league information.

28. The system of claim 27, wherein the additional sports player information input by the counselors comprises: graduation class years, class ranks, grade point averages, SAT scores, ACT scores, transcripts, or combinations thereof.

29. The system of claim 1, wherein the data storage further comprises:
   a library of prewritten messages stored therein comprising:
      first messages for transmission to the coaches, athletic directors, or other personnel for receiving ratings, ability levels, and comments;
      second messages for transmission to the college recruiters;
      third messages for transmission to the sports players;
      fourth messages for transmission to the coaches for submittal of additional sports player information;
      fifth messages for transmission to the coaches to provide thanks the coaches for submitting the additional sports player information and rating the sports players;
      sixth messages for transmission to particular coaches when sports players coached by the particular coaches have been added into the library of league information to allow the particular coaches to input additional sports player information related to the sports players;
      seventh messages for transmission to email addresses of friends of sports players to invite the friends to view the associated sports player profiles;
      eighth messages for transmission to counselors at the schools to allow the counselors to login to the user interface and use counselor profiles to input additional sports player information into the library of league information; or
      combinations thereof; and
   computer instructions in the data storage to transmit the messages from the library of prewritten messages to the athletic directors, the other personnel, the coaches, the college recruiters, the counselors, the friends, and the sports players via the network, wherein each message is an email, text message, or combinations thereof.

30. The system of claim 1, further comprising computer instructions in the data storage to allow the search results to be sortable by: names of the sports players, the schools associated with the sports players, sports player positions, heights, weights, graduation class years, class ranks, average ratings, grade point averages, SAT scores, ACT scores, uniform numbers, links to game videos, forty yard dash times, maximum bench press weights, vertical jump test distances, short shuttle test times, long shuttle test times, sports played, states associated with the sports players, leagues associated with the sports players, classifications or divisions associated with the sports players, other sports player statistics, sports player email addresses, or combinations thereof.

31. The system of claim 1, further comprising computer instructions in the data storage to instruct the processor to:
   allow selection of a sports player physical address from the sports player contact information to generate and transmit an automated letter for mailing via postal mail or to allow production of a custom letter for mailing via postal mail;
   allow selection of a sports player telephone number from the sports player contact information to generate and transmit an automated text message, automated voice message, custom text message, or custom voice mail to the sports player telephone number, or to allow direct voice communication with the sports players through the user interface over the network; and
   allow selection of a sports player email address of the sports player contact information to generate and transmit an automated email or a custom email to the sports player email address.

* * * * *